(12) United States Patent
Hamada

(10) Patent No.: US 11,470,464 B2
(45) Date of Patent: Oct. 11, 2022

(54) COMMUNICATION APPARATUS, MANAGEMENT APPARATUS, AND METHODS FOR CONTROLLING THE SAME

(71) Applicant: CANON KABUSHIKI KAISHA, Tokyo (JP)

(72) Inventor: Masashi Hamada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 17/133,725

(22) Filed: Dec. 24, 2020

(65) Prior Publication Data
US 2021/0227375 A1 Jul. 22, 2021

(30) Foreign Application Priority Data
Jan. 16, 2020 (JP) .............................. JP2020-005409

(51) Int. Cl.
| | |
|---|---|
| *H04W 4/50* | (2018.01) |
| *H04L 29/08* | (2006.01) |
| *H04W 8/18* | (2009.01) |
| *H04W 68/00* | (2009.01) |
| *H04L 43/08* | (2022.01) |
| *H04W 84/04* | (2009.01) |

(52) U.S. Cl.
CPC .............. *H04W 8/18* (2013.01); *H04L 43/08* (2013.01); *H04W 68/005* (2013.01); *H04W 84/042* (2013.01)

(58) Field of Classification Search
None
See application file for complete search history.

(56) References Cited

U.S. PATENT DOCUMENTS

| | | |
|---|---|---|
| 8,761,049 B2 | 6/2014 | Hamada |
| 9,491,791 B2 | 11/2016 | Hamada |
| 2021/0377722 A1* | 12/2021 | Fan .......................... H04W 4/50 |

FOREIGN PATENT DOCUMENTS

JP      2018-078445 A      5/2018

* cited by examiner

Primary Examiner — Gary Lafontant
(74) Attorney, Agent, or Firm — Carter, DeLuca & Farrell LLP

(57) ABSTRACT

A communication apparatus extracts a wireless network identifier from a received notification signal; based on the extracted wireless network identifier, confirms whether or not there is present a second communication operator, among communication operators other than a first communication operator of a wireless network currently being used, that is currently usable and satisfies a predetermined condition; and in the case where its presence is confirmed, makes a request for a communication profile to a subscription management apparatus that manages a communication profile for the second communication operator.

13 Claims, 21 Drawing Sheets

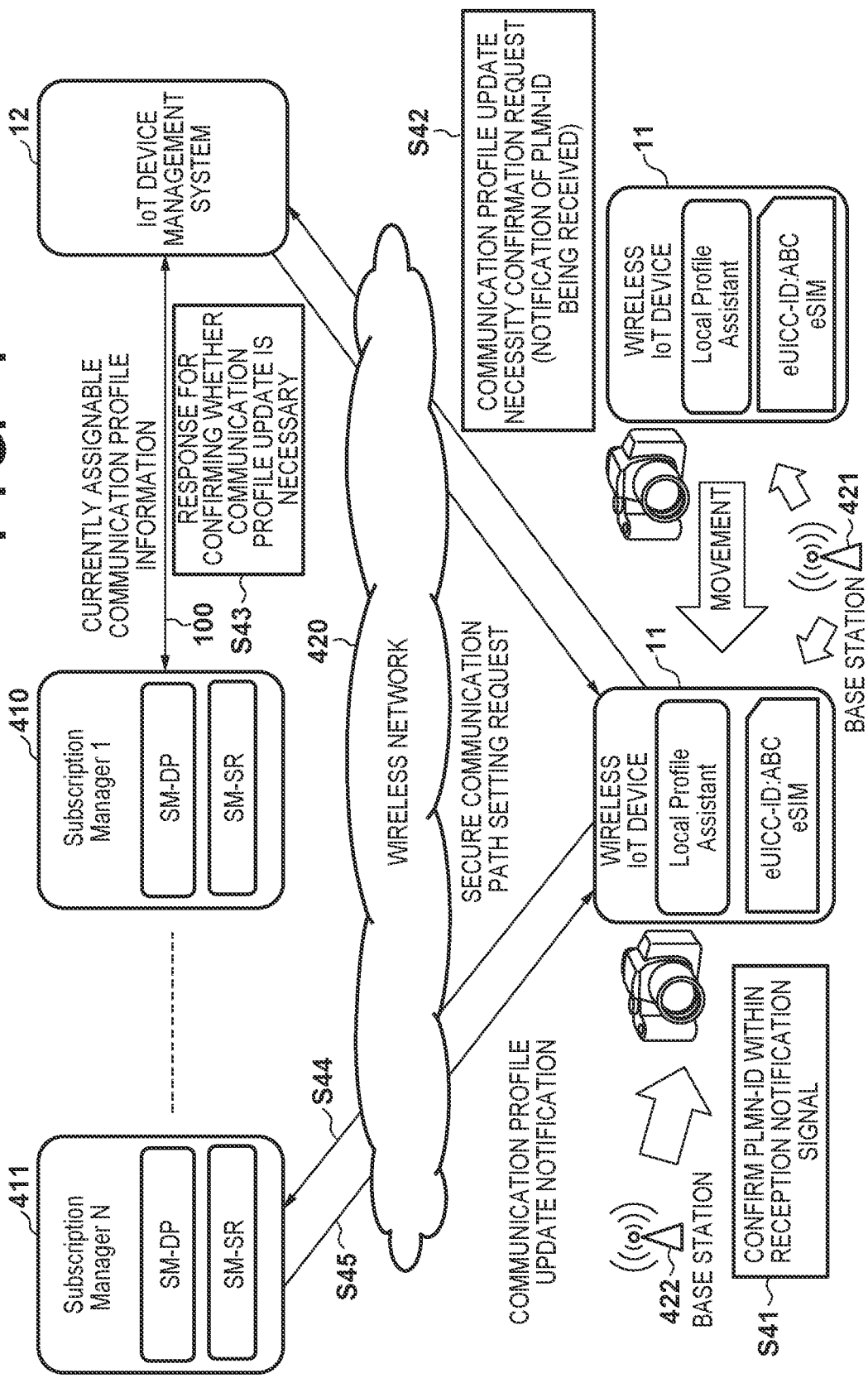

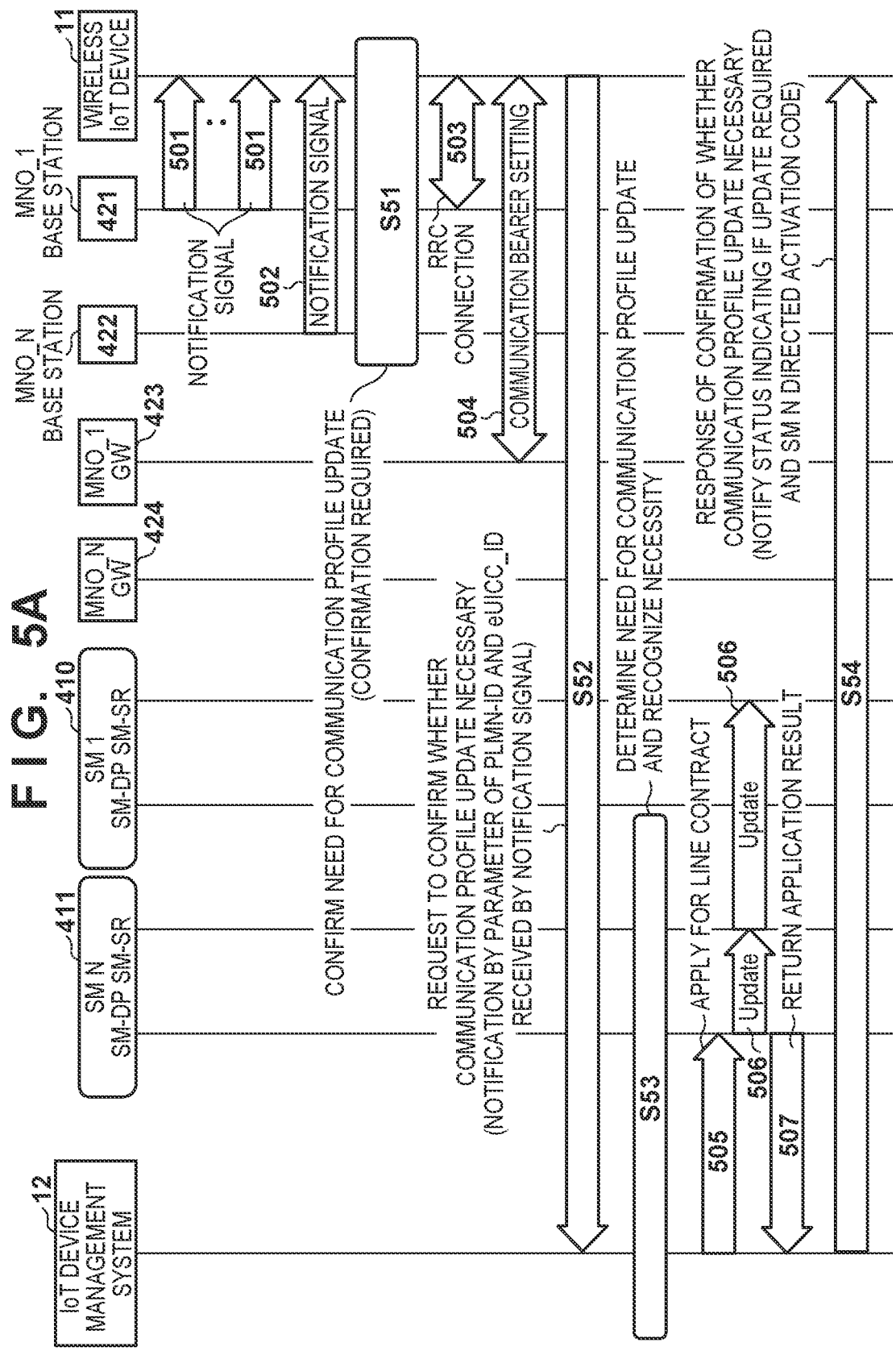

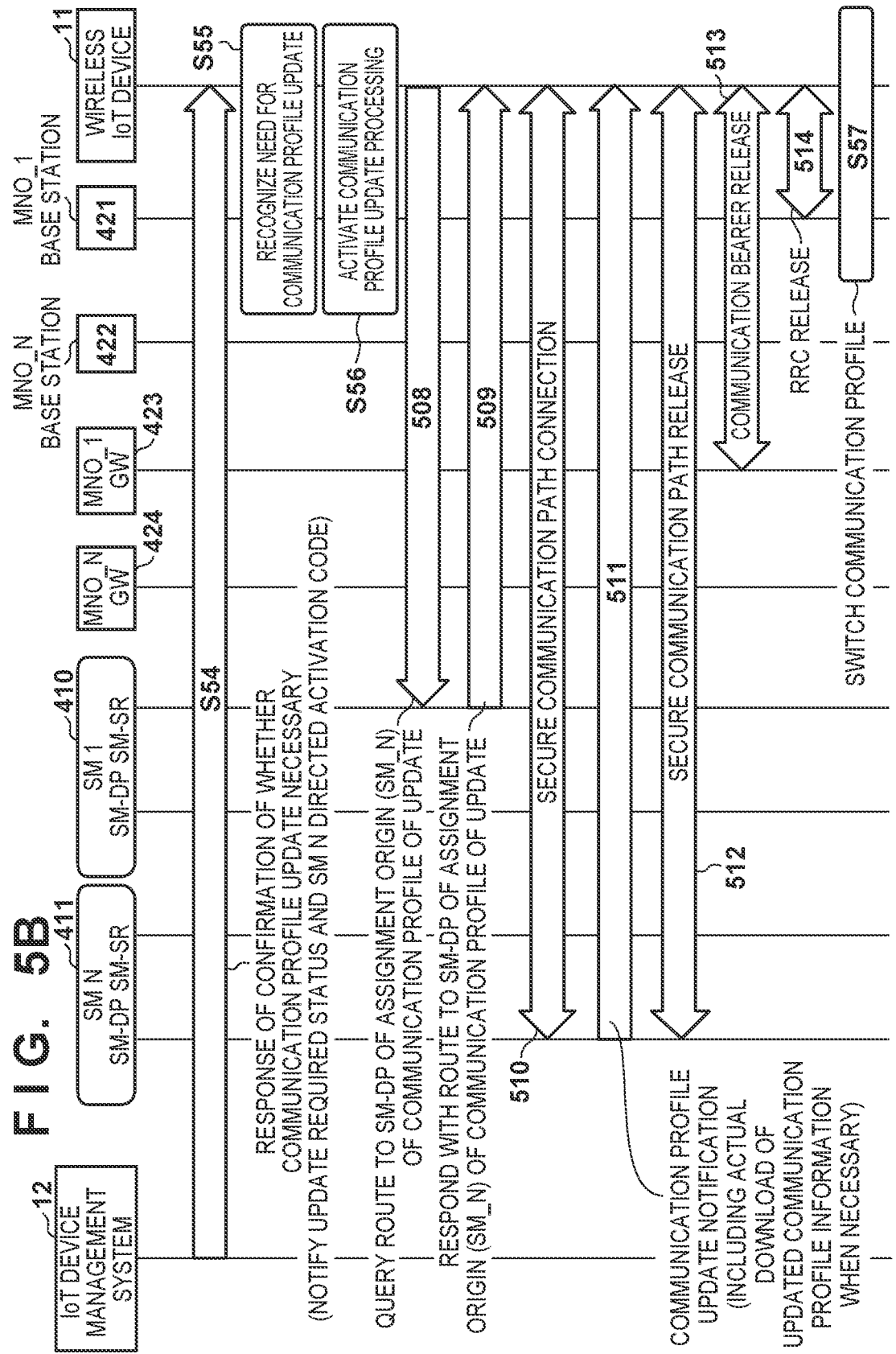

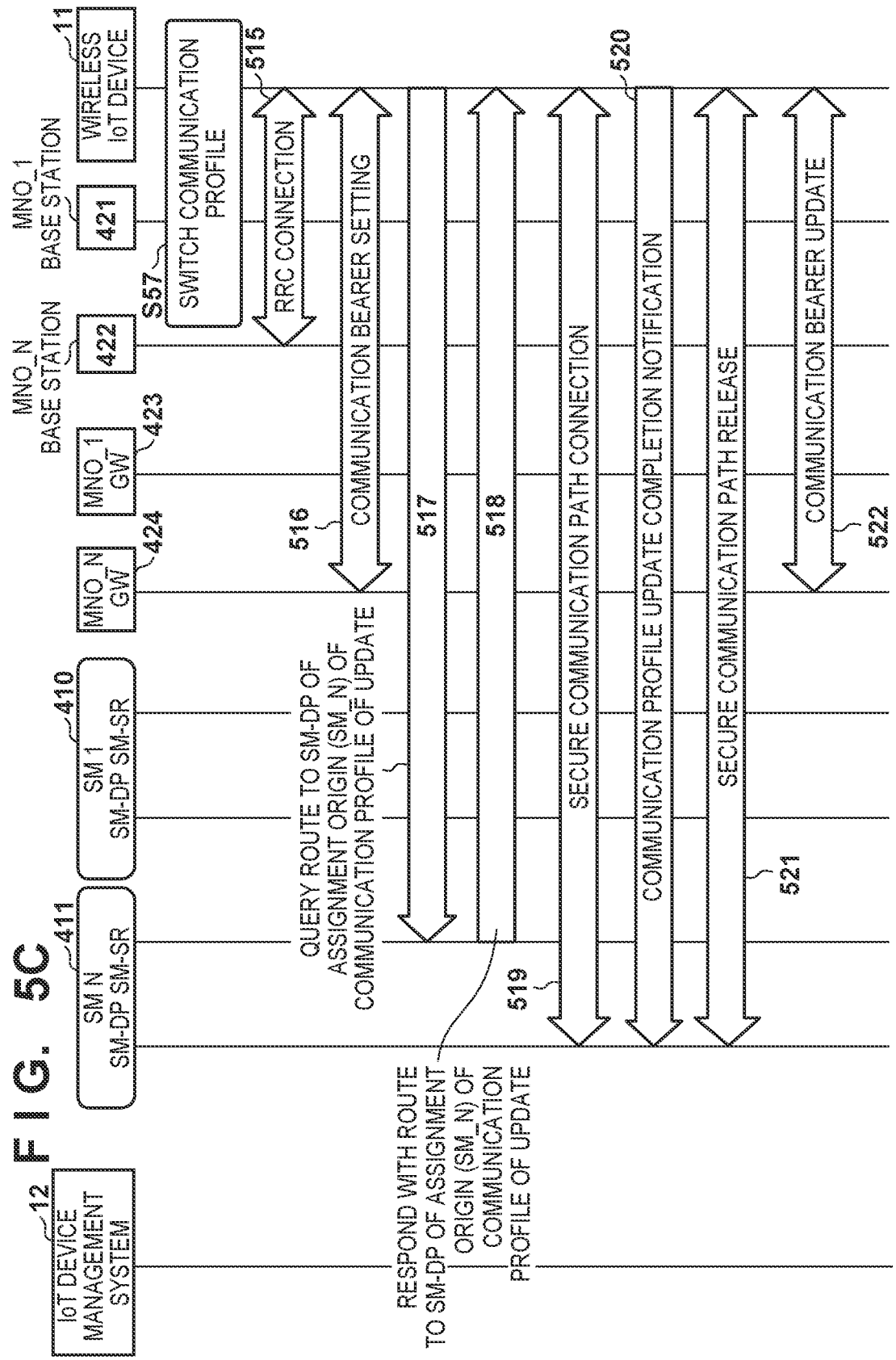

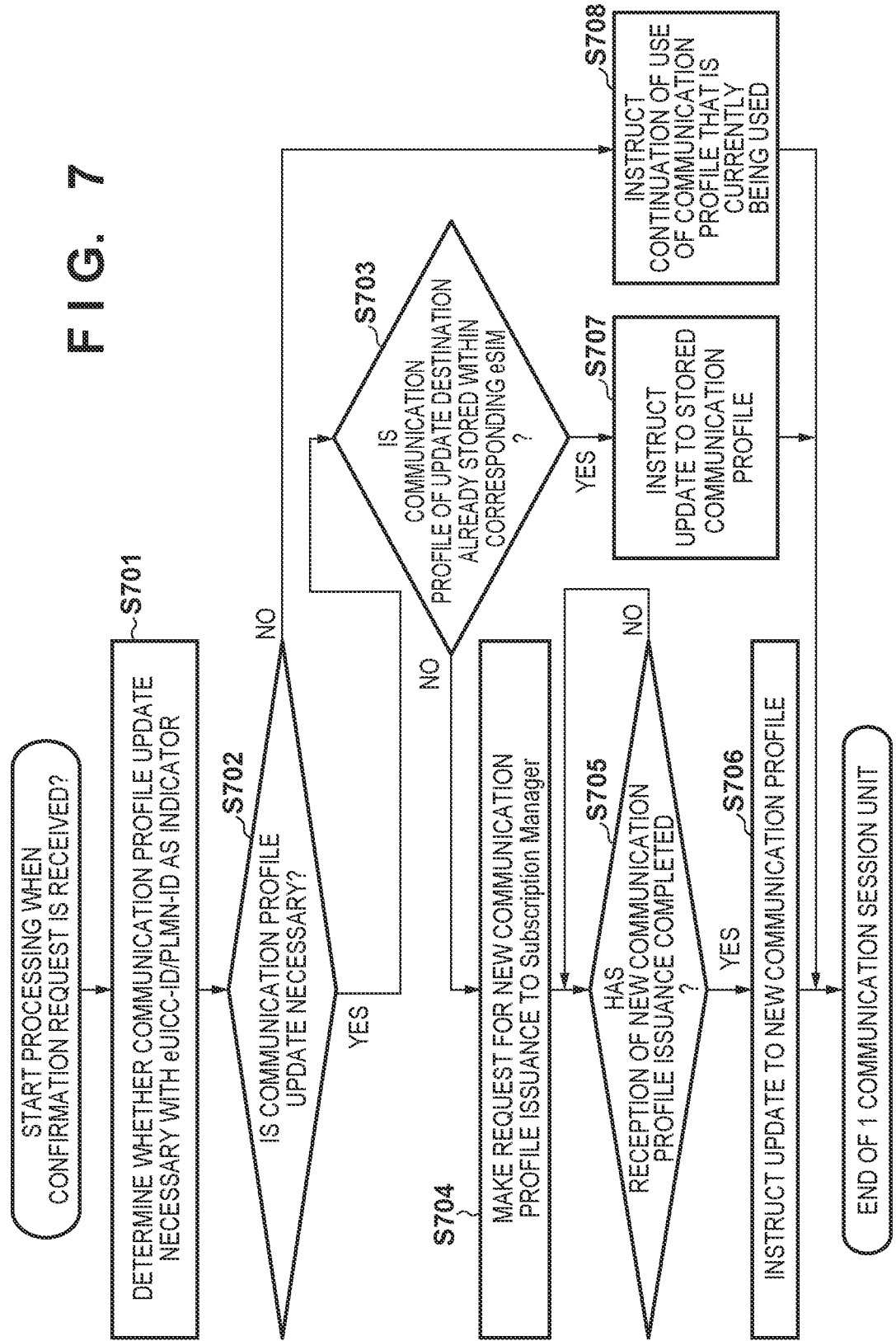

F I G. 8  ASSIGNABLE COMMUNICATION PROFILE INFORMATION MANAGEMENT DATABASE  310

| MCC | PRIORITY (FEE) | PRIORITY (SPEED) | PLMN-ID | OperatorName | IMSI | ASSIGNMENT |
|---|---|---|---|---|---|---|
| 440,441 | 1 | 1 | 441-91 | SELF-OPERATED BWA_OPERATOR_A | 44191A987654321 | O |
|  |  |  |  |  | 44191A987655320 | A |
|  | 2 | 3 | 440-00 | COMMUNICATION_ OPERATOR_A | 440001234566789A | D |
|  |  |  |  |  | 44000123456800 | O |
|  | 3 | 2 | 440-20 | COMMUNICATION_ OPERATOR_B | 44020123456700 | A |
| 310 | 1 | 1 | 310-150 | COMMUNICATION_ OPERATOR_C | 310150987654320 | O |
|  | : | : | : | : | : |  |

PRIORITY FOR SUITABILITY DETERMINATION

O: CURRENTLY BEING USED
D: ALREADY DISTRIBUTED
A: DISTRIBUTABLE

FIG. 9 eSIM MANAGEMENT DATABASE

| MANAGE TARGET eUICC-ID | PRIORITY (FEE) | PRIORITY (SPEED) | PLMN-ID | ALREADY ASSIGNED ICCID | ALREADY ASSIGNED IMSI | CURRENT Status |
|---|---|---|---|---|---|---|
| ABCDEF...00 | 1 | 1 | 441-91 | 898100AB..F0 | 44191A987654321 | enable |
|  | 3 | 2 | 440-20 | 898100AB..F1 | 440201234567 89A | disable |
|  | 1 | 1 | 310-150 | 898100AB..F2 | 31015098765 4321 | disable |
| .. |  |  |  | .. | .. | .. |
| ABCDEF...01 | 2 | 3 | 440-00 | 898100AA..F0 | 44000A987654322 | disable |
|  | 1 | 1 | 310-150 | 898100AA..F1 | 31015098765 4322 | enable |
| .. |  |  |  | .. | .. | .. |

PRIORITY FOR SUITABILITY DETERMINATION

320

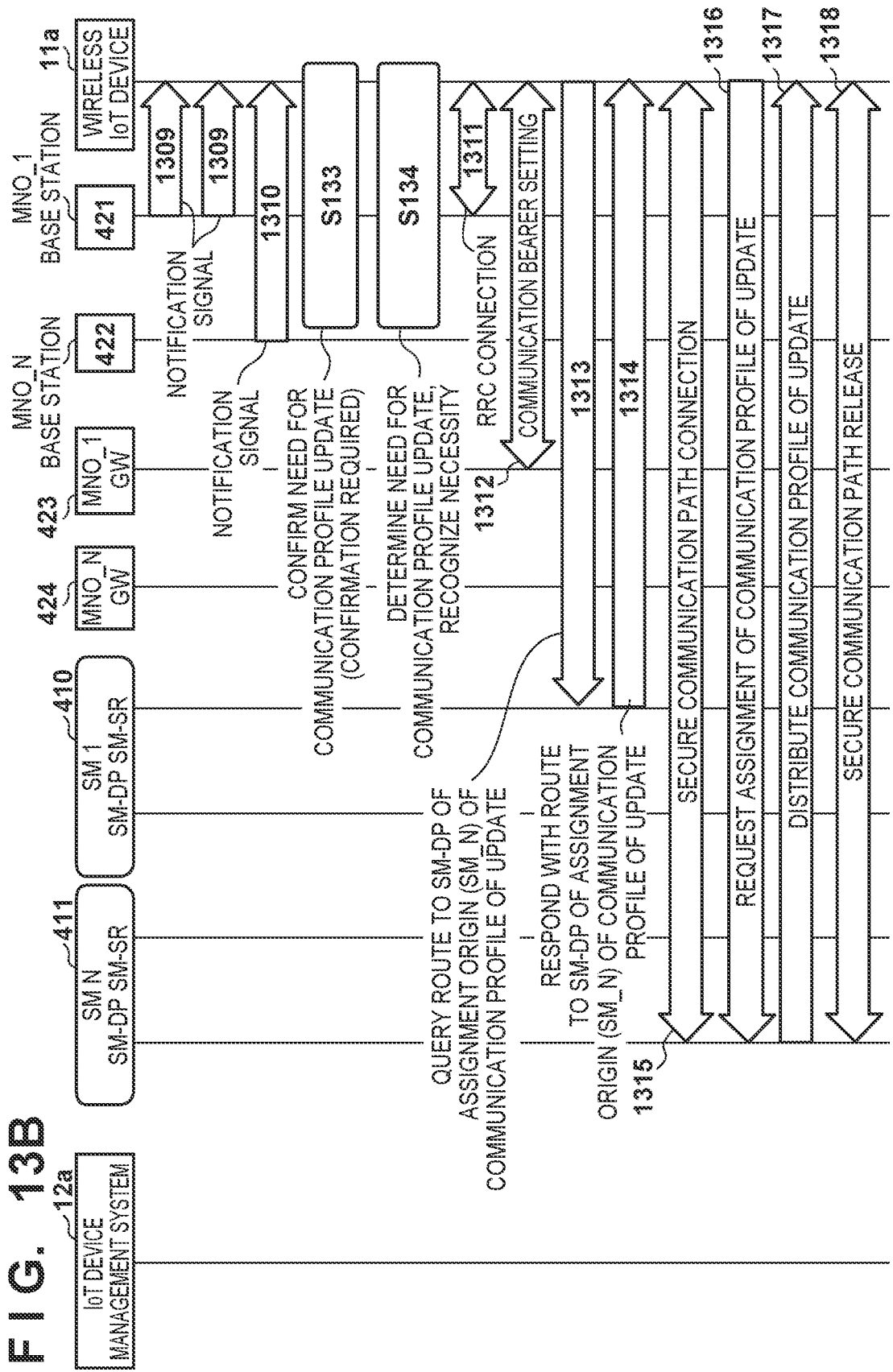

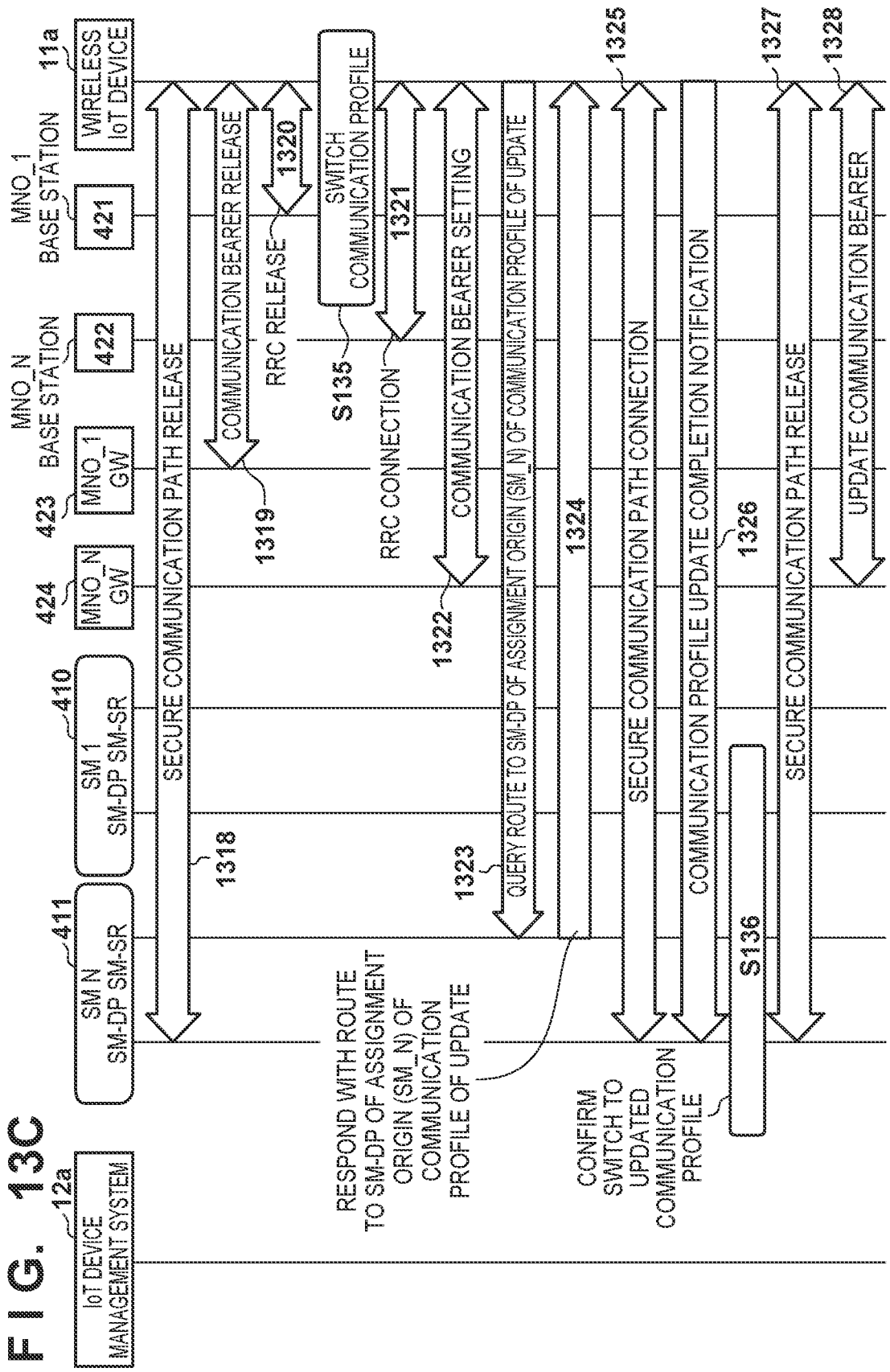

FIG. 14

CONFIGURATION EXAMPLE OF SUITABILITY INFORMATION

| MANAGE TARGET eUICC-ID | PRIORITY (FEE) | PRIORITY (SPEED) | PLMN-ID | ALREADY ASSIGNED ICCID | ALREADY ASSIGNED IMSI | CURRENT Status |
|---|---|---|---|---|---|---|
| ABCDEF...00 | 1 | 1 | 441-91 | 898100AB...F0 | 44191A987654321 | enable |
|  | 3 | 2 | 440-20 | 898100AB...F1 | 440201234567 89A | disable |
|  | 1 | 1 | 310-150 | 898100AB...F2 | 3101509876543 21 | disable |

PRIORITY FOR SUITABILITY DETERMINATION

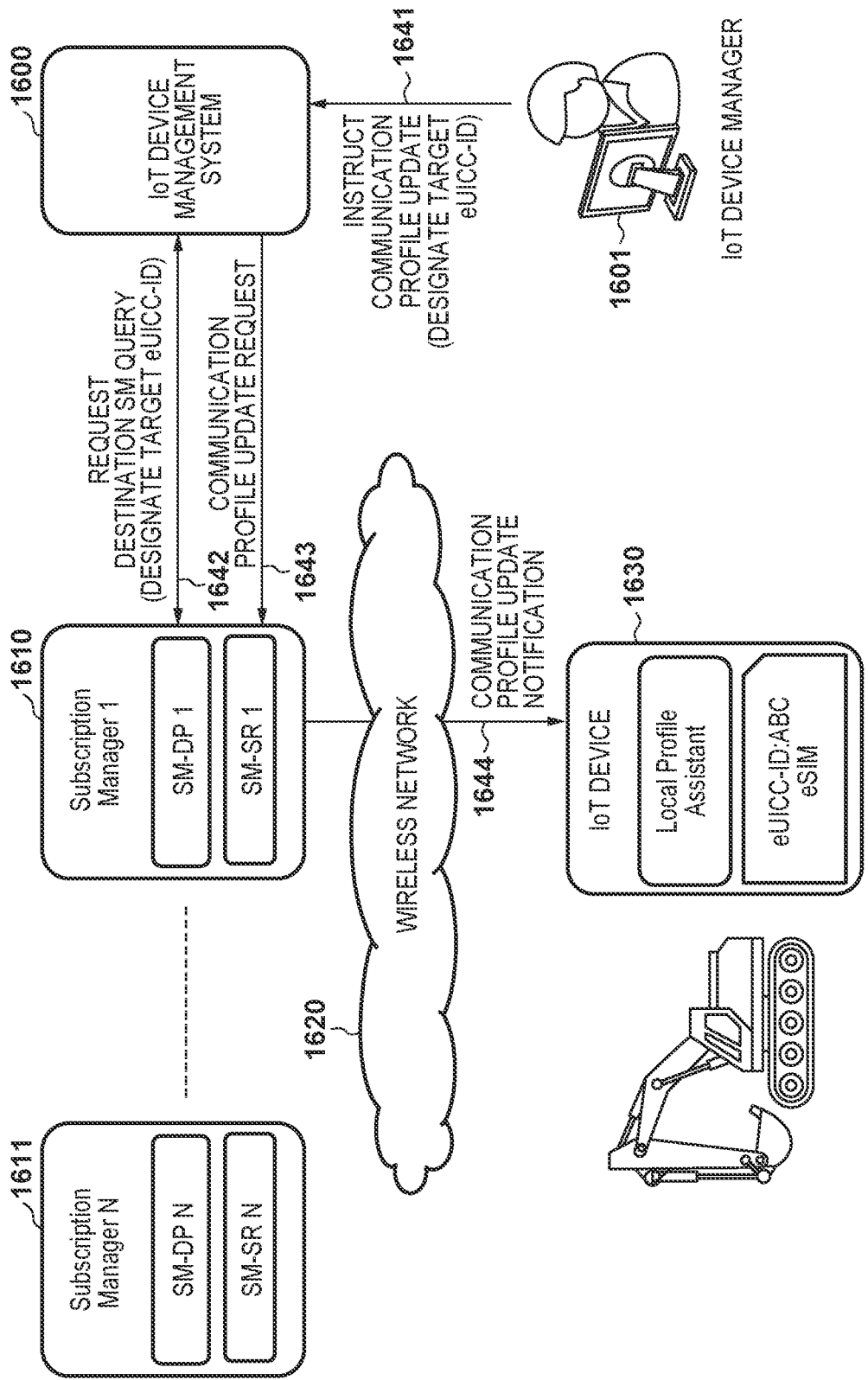

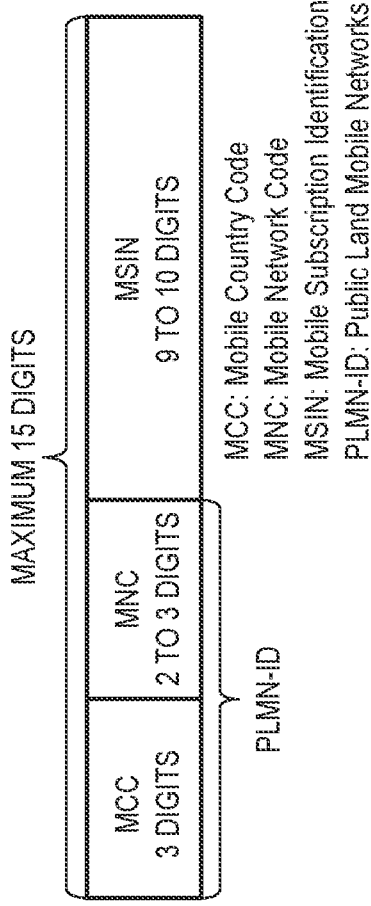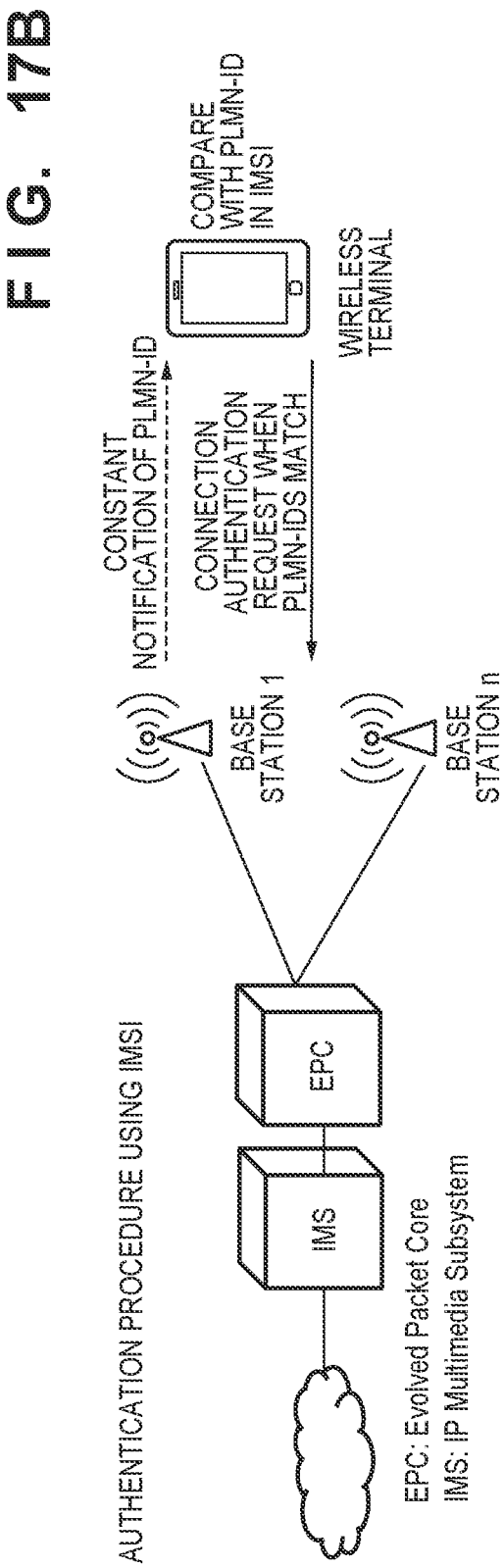

ns 1, 470, 464 B2

COMMUNICATION APPARATUS, MANAGEMENT APPARATUS, AND METHODS FOR CONTROLLING THE SAME

BACKGROUND OF THE INVENTION

Field of the Invention

The present invention relates to a communication apparatus, a management apparatus, and methods for controlling the same.

Description of the Related Art

A public wireless communication apparatus performs communication by using a communication profile of a communication operator. In Japanese Patent Laid-Open No. 2018-078445, a configuration is disclosed in which a plurality of communication profiles are stored in advance in a wireless communication apparatus, and the communication profile that the wireless communication apparatus uses is switched periodically.

It is typical for a communication profile of a wireless communication apparatus to be stored by the supplier of a wireless communication apparatus in a wireless communication apparatus prior to shipment or at the time of installation. Accordingly, even if the wireless communication apparatus is within a communication area of a communication operator of more suitable conditions than the communication operators corresponding to the communication profiles stored in the wireless communication apparatus, it is not possible for the wireless communication apparatus to perform communication using that communication operator. This is because a valid communication profile for the suitable communication operator is not stored in the wireless communication apparatus.

SUMMARY OF THE INVENTION

The present invention provides a technique for enabling a communication profile that the wireless communication apparatus uses to be updated to a more suitable communication profile for a location at which the wireless communication apparatus operates.

According to one aspect of the present invention, there is provided a communication apparatus, comprising: an extraction unit configured to extract a wireless network identifier from a received notification signal; a confirmation unit configured to, based on the wireless network identifier, confirm whether or not there is present a second communication operator, among communication operators other than a first communication operator of a wireless network currently being used, that is currently usable and satisfies a predetermined condition; a request unit configured to, in a case where it is confirmed that the second communication operator is present, make a request for a communication profile for the second communication operator to a subscription management apparatus of the second communication operator; and an update unit configured to update a communication profile to be used to a communication profile acquired from the subscription management apparatus of the second communication operator by the request.

According to another aspect of the present invention, there is provided a management apparatus operable to manage a communication apparatus, the management apparatus comprising: a management unit configured to manage a communication profile that can be assigned to the communication apparatus and an attribute of the communication profile; a determination unit configured to, based an attribute of a communication profile corresponding to a wireless network identifier that was notified from the communication apparatus, determine whether or not a switch of the communication profile that the communication apparatus uses should be performed; and a notification unit configured to make a notification to the communication apparatus of a result of the determination by the determination unit.

According to another aspect of the present invention, there is provided a management apparatus operable to manage a communication apparatus, the management apparatus comprising: a storage unit configured to store suitability information including a communication profile that can be assigned to the communication apparatus and an attribute of the communication profile; an update unit configured to update the suitability information as necessary; and a notification unit configured to, in a case where the suitability information is updated by the update unit, make a notification to the communication apparatus of the suitability information.

According to another aspect of the present invention, there is provided a control method, comprising: extracting a wireless network identifier from a received notification signal; based on the wireless network identifier, confirming whether or not there is present a second communication operator, among communication operators other than a first communication operator of the wireless network currently being used, that is currently usable and satisfies a predetermined condition; in a case where it is confirmed that the second communication operator is present, making a request for a communication profile for the second communication operator to a subscription management apparatus of the second communication operator; and updating a communication profile to be used to a communication profile acquired from a subscription management apparatus of the second communication operator by the request.

According to another aspect of the present invention, there is provided a method of controlling a management apparatus operable to manage a wireless communication apparatus, the method comprising: managing a communication profile that can be assigned to the wireless communication apparatus and an attribute of the communication profile; based an attribute of a communication profile corresponding to a wireless network identifier that was notified from the wireless communication apparatus, determining whether or not a switch of the communication profile that the wireless communication apparatus uses should be performed; and making a notification to the wireless communication apparatus of a result of the determination.

According to another aspect of the present invention, there is provided a method of controlling a management apparatus operable to manage a wireless communication apparatus, the method comprising: storing suitability information including a communication profile that can be assigned to the wireless communication apparatus and an attribute of the communication profile; updating the suitability information as necessary; and in a case where the suitability information is updated by the updating, making a notification to the wireless communication apparatus of the suitability information.

According to another aspect of the present invention, there is provided a non-transitory computer readable storage medium in which a program for causing a computer to execute a control method is stored, the control method comprising: extracting a wireless network identifier from a received notification signal; based on the wireless network identifier, confirming whether or not there is present a second communication operator, among communication operators other than a first communication operator of the wireless network currently being used, that is currently usable and satisfies a predetermined condition; in a case where it is confirmed that the second communication operator is present, making a request for a communication profile for the second communication operator to a subscription management apparatus of the second communication operator; and updating a communication profile to be used to the communication profile acquired from the subscription management apparatus of the second communication operator by the request.

According to another aspect of the present invention, there is provided a non-transitory computer readable storage medium in which a program for causing a computer to execute a control method for managing a wireless communication apparatus is stored, the control method comprising: managing a communication profile that can be assigned to the wireless communication apparatus and an attribute of the communication profile; based an attribute of a communication profile corresponding to a wireless network identifier that was notified from the wireless communication apparatus, determining whether or not a switch of the communication profile that the wireless communication apparatus uses should be performed; and making a notification to the wireless communication apparatus of a result of the determination by the determining.

According to another aspect of the present invention, there is provided a non-transitory computer readable storage medium in which a program for causing a computer to execute a control method for managing a wireless communication apparatus is stored, the control method comprising: storing suitability information including a communication profile that can be assigned to the wireless communication apparatus and an attribute of the communication profile; updating the suitability information as necessary; and in a case where the suitability information is updated by the updating, make a notification to the wireless communication apparatus of the suitability information.

Further features of the present invention will become apparent from the following description of exemplary embodiments with reference to the attached drawings.

BRIEF DESCRIPTION OF THE DRAWINGS

FIG. 4 is a schematic diagram illustrating processing for updating a communication profile according to a first embodiment.

FIGS. 5A through 5C are sequence diagrams for describing processing for updating communication profile according to a first embodiment.

FIG. 7 is a flowchart for describing processing of a device management system according to a first embodiment.

FIG. 8 is a view illustrating an example of a data configuration of a communication profile management database.

FIG. 9 is a view illustrating an example of a data configuration of an eSIM management database.

FIGS. 13A to 13C are sequence diagrams for describing processing for updating a communication profile according to the second embodiment.

FIG. 14 is a view for illustrating an example of suitability information maintained by the wireless communication apparatus according to a second embodiment.

FIG. 16 is a view for illustrating an example of a system in which an IoT device manager updates a communication profile in an eSIM.

FIG. 17A is a view illustrating a configuration of IMSI (International Mobile Subscription Identity) information.

FIG. 17B is a schematic diagram of a wireless authentication control procedure that uses IMSI.

DESCRIPTION OF THE EMBODIMENTS

Figure 1:
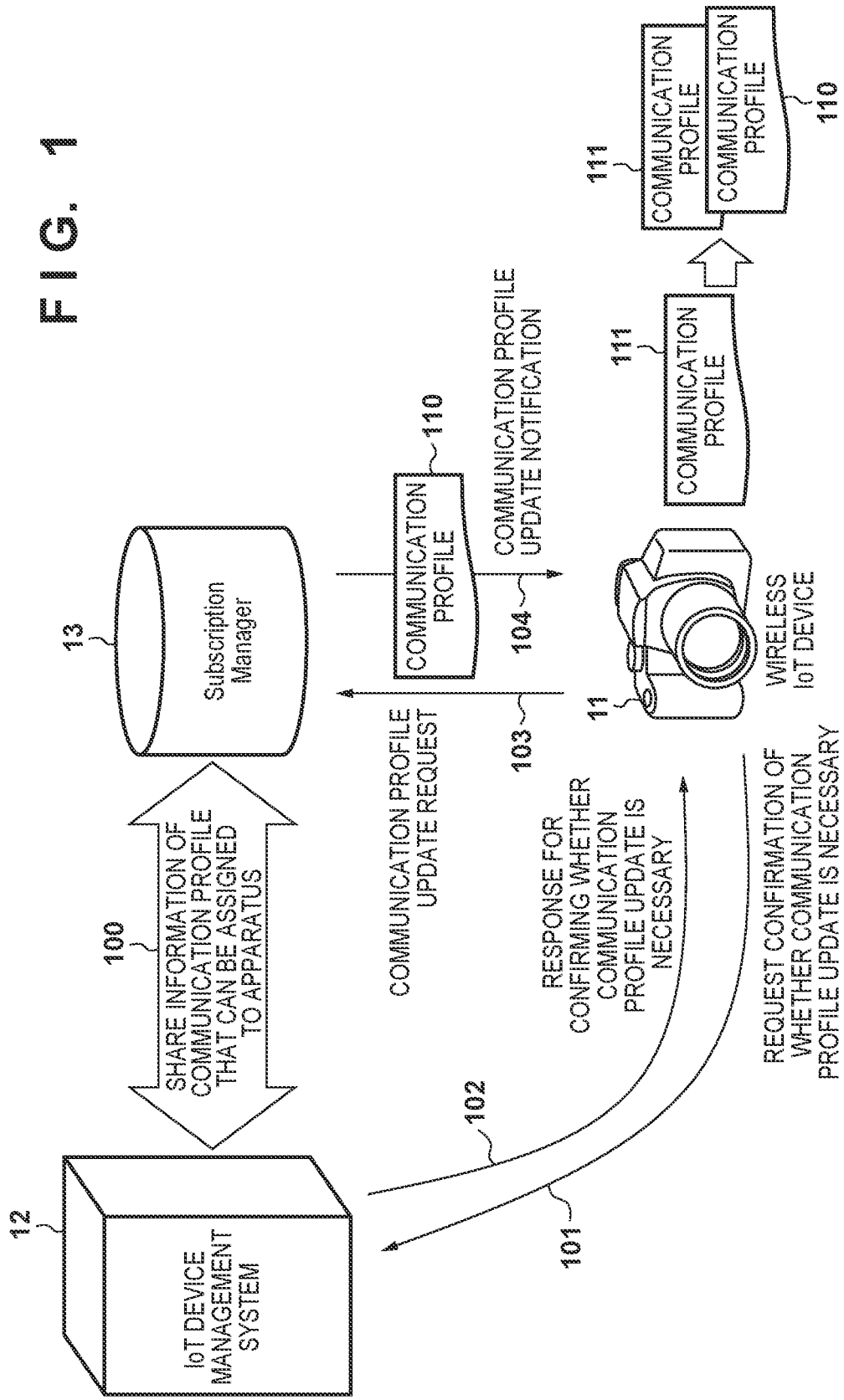
FIG. 1 is a view illustrating an example of a configuration of a wireless communication system according to a first embodiment.

Hereinafter, embodiments will be described in detail by referring to the accompanying drawings. Note, the following embodiments are not intended to limit the scope of the claimed invention, and limitation is not made an invention that requires a combination of all features described in the embodiments. Although several features are described in the embodiments, all of these features are not necessarily required for the invention, and multiple features may be combined as desired. Furthermore, in the accompanying drawings, the same or similar configurations are given the same reference signs, and redundant descriptions thereof will be omitted.

<Regarding Updating of a Communication Profile by a Manager of an IoT (Internet of Things) Device>

First, as an example for comparison against embodiments of the present invention described below, operation of a system in which the IoT device manager updates a communication profile stored in an eSIM (embedded Subscriber Identity Module) in a wireless communication apparatus will be described with reference to FIG. 16.

FIG. 16 is a schematic diagram of a wireless communication system in which the IoT device manager updates a communication profile stored in an eSIM in a wireless communication apparatus (wireless IoT device). In FIG. 16, an example of a construction machine provided with a wireless IoT device 1630 is illustrated. By an instruction from a manager 1601 of the IoT device, a communication profile maintained by the eSIM in the wireless IoT device 1630 is updated for a location at which the construction machine (the wireless IoT device 1630) operates.

The manager 1601 of the wireless IoT device 1630 (the construction machine) determines whether or not an update of the communication profile being used is necessary based on the current location information of the wireless IoT device 1630. The manager 1601, in the case where an update is determined to be necessary, makes an instruction 1641 for updating the communication profile by making a designation of device identification information (eUICC-ID) of the eSIM to be updated and a communication operator to which to switch, to an IoT device management system 1600. The IoT device management system 1600 performs a request destination SM query 1642 in advance, and acquires an access destination of the subscription management apparatus (Subscription Manager) 1610. The IoT device management system 1600, after receiving the update instruction 1641, requests (an update request 1643) that the communication profile of the eSIM in the designated wireless IoT device 1630 be updated to the communication profile to which to switch. A subscription management apparatus 1610 issues a communication profile update notification 1644 in accordance with the update request 1643. The wireless IoT device 1630, after receiving the update notification 1644, updates the communication profile maintained in the eSIM in accordance with the update notification 1644.

In the control for updating the communication profile illustrated in FIG. 16, an update to the communication profile of the communication operator designated by an operation on the side of the supplier of the wireless IoT device 1630 is performed at the location at which the wireless IoT device 1630 operates. However, it is not necessarily the case that the information of the MNO (mobile communication operator: Mobile Network Operator) of a base station near the location at which the wireless IoT device 1630 in which the eSIM is provided operates can always be ascertained by the IoT device management system 1600. Accordingly, even if the wireless IoT device 1630 is within the service area of a communication operator with more advantageous communication conditions, it is not able to select that communication operator if the IoT device management system 1600 has not ascertained that fact. Accordingly, there are cases where even when the wireless IoT device 1630 is within a communication area of a communication operator with more suitable conditions than the designated communication operator, the corresponding communication profile cannot be acquired, and it is not possible to use that communication operator.

Below, with reference to the drawings, description will be given of embodiments of a wireless IoT device and a communication system that automatically updates a communication profile used in an eSIM within the wireless IoT device to something that is suitable in accordance with the location at which the wireless IoT device operates.

First Embodiment

FIG. 17A is a schematic diagram illustrating an example of an IMSI (International Mobile Subscription Identity) configuration which is wireless apparatus identification information used in the wireless communication system of the present embodiment. The IMSI is configured by a PLMN-ID (Public Land Mobile Network-IDentifier) and an MSIN (Mobile Subscription Identification Number). The PLMN-ID is configured by an MCC (Mobile Country Code) and an MNC (Mobile Network Code).

FIG. 17B is a schematic diagram illustrating an activation procedure for wireless connection authentication processing of a wireless communication apparatus (wireless terminal) that uses the IMSI of FIG. 17A. A wireless communication apparatus receives a notification signal steadily transmitted intermittently from a wireless communication base station (hereinafter referred to as the base station), and detects a PLMN-ID as a wireless network identifier included in that notification signal. In the embodiment described below, detection of the PLMN-ID included in the notification signal is a determination that "the wireless communication apparatus is in a state in which it is within a wireless cell controlled by the communication operator", and this is used as an activation condition for re-selection of the communication operator.

FIG. 1 is a block diagram illustrating an example of a configuration of a wireless communication system according to a first embodiment. The wireless communication system automatically changes the communication profile that the eSIM within a wireless IoT device 11 (which is a wireless communication apparatus) uses. In the present embodiment, an image capturing apparatus is described as the example of the wireless IoT device 11, but limitation is not made to this. In other words, in the present invention, various apparatuses in which a wireless communication function is provided may be applied, such as various IoT devices, a personal computer, a smart phone, and the like. An IoT device management system 12 is a management apparatus for managing the wireless IoT device 11 via a network. The IoT device management system 12 manages conditions of an assignment of a communication profile to the wireless IoT device 11. Also, the IoT device management system 12 manages communication profiles that can be assigned to the wireless communication apparatus, and attributes thereof. A subscription management apparatus 13 (Subscription Manager) manages a communication profile maintained in the eSIM in the wireless IoT device 11. Between the IoT device management system 12 and the subscription management apparatus 13, information as to whether or not there is a communication profile that can be assigned to the wireless IoT device 11 is shared using periodic message exchange or the like (100).

The wireless IoT device 11 transmits a message (a request 101 to confirm whether a communication profile update is necessary) that is for requesting confirmation as to whether it is necessary to update a communication profile to the IoT device management system 12 which manages itself. The IoT device management system 12, in response to the confirmation request 101, transmits to the wireless IoT device 11a message (a response 102 confirming whether or not a communication profile update is necessary) indicating the result of the confirmation.

The wireless IoT device 11, when the need for a communication profile update is recognized from the confirmation response 102, transmits a message (an update request 103) for requesting an update of a communication profile to the subscription management apparatus 13. Then, the wireless IoT device 11, upon receiving the response message corresponding to the update request 103 from the subscription management apparatus 13 (the communication profile update notification 104), acquires a communication profile 110 of the update target.

The wireless IoT device 11, when the communication profile 110 of the update target is acquired from the subscription management apparatus 13, updates the target communication profile from the currently used communication profile 111 to the communication profile 110. In other words, the wireless IoT device 11 sets the communication profile 111 to disabled and the communication profile 110 to enabled. Note that the communication profile of the present embodiment is subscription information that a wireless communication operator provides, and for example a telephone number, IMSI (FIG. 17A), or the like are envisioned.

Figure 2:
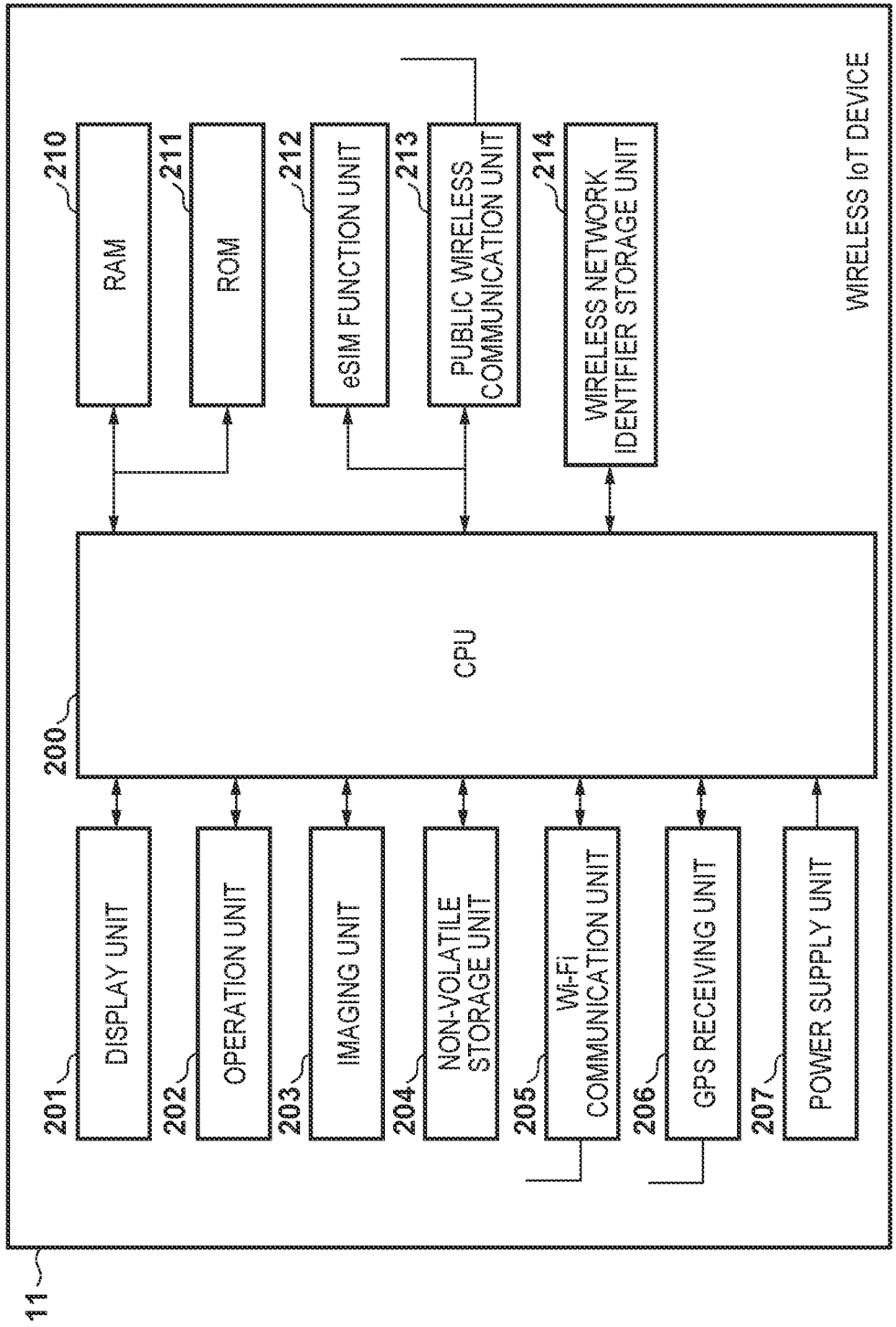
FIG. 2 is a view illustrating an example of a block diagram of a functional configuration of a wireless communication apparatus according to a first embodiment.

FIG. 2 is a block diagram illustrating an example of a functional configuration of an image capturing apparatus as the wireless IoT device 11 according to a first embodiment. The wireless IoT device 11 comprises a CPU 200, a display unit 201, an operation unit 202, an imaging unit 203, a non-volatile storage unit 204, a Wi-Fi communication unit 205, a GPS receiving unit 206, a power supply unit 207, a RAM 210, and a ROM 211. Also, the wireless IoT device 11 comprises an eSIM function unit 212, a public wireless communication unit 213, and a wireless network identifier storage unit 214.

The CPU 200 has one or more processors, and by executing programs stored in the non-volatile storage unit 204, the RAM 210, or the ROM 211, realizes various control. The CPU 200, for example, realizes various operations of the wireless IoT device 11 described later in the flowcharts and the like. Note that some or all of the operations of the later-described wireless IoT device 11 may be realized by cooperation of hardware and the CPU 200, and may be configured by dedicated hardware on its own.

The display unit 201 performs various displaying such as a live-view display, a reproduced image display, or the like, under control of the CPU 200. The operation unit 202 includes a shutter button or the like, and receives an operation input from a user. The imaging unit 203 has an image capturing element such as a CCD, and captures images. The non-volatile storage unit 204 is a memory card capable of attaching/detaching, for example, and stores images that the imaging unit 203 captures. In the non-volatile storage unit 204, programs to be executed by the CPU 200 are stored. In such a case, a program that is stored in the non-volatile storage unit 204 is loaded into the RAM 210 as necessary and executed by the CPU 200. The Wi-Fi communication unit 205 realizes Wi-Fi communication. The GPS receiving unit 206 receives a GPS signal and generates position information indicating the current position of the wireless IoT device 11. The power supply unit 207 includes a battery (not shown) and provides the necessary power to each unit in the wireless IoT device 11.

The RAM 210 stores programs that the CPU 200 executes and provides a working area when the CPU 200 executes various processes. The ROM 211 stores programs that the CPU 200 executes and various data. The eSIM function unit 212 controls wireless communication over the public wireless communication unit 213 using the communication operator in the eSIM. The wireless network identifier storage unit 214 temporarily stores a wireless network identifier included in the notification signal received from the base station. In the present embodiment, the PLMN-ID is used as a wireless network identifier, and the wireless network identifier storage unit 214 temporarily stores this PLMN-ID. Note, the RAM 210 may be used as the wireless network identifier storage unit 214. Note, when the wireless network identifier storage unit 214 ceases to receive a notification signal including a wireless network identifier, it deletes that wireless network identifier.

Figure 3:
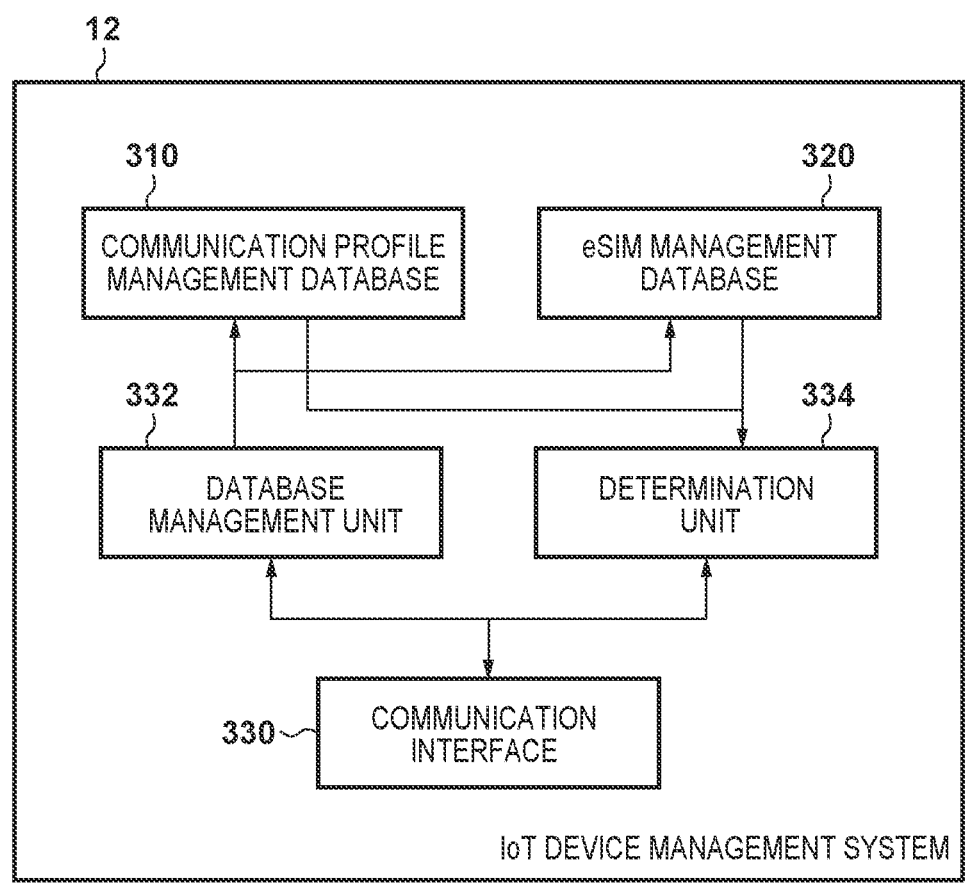
FIG. 3 is a block diagram illustrating an example of a functional configuration of a device management system according to a first embodiment.

FIG. 3 is a block diagram illustrating an example of a functional configuration of the IoT device management system 12 according to a first embodiment. In the IoT device management system 12, a communication profile management database 310 manages communication profiles that are the target of distribution. An eSIM management database 320 manages a communication profile for each eSIM of an IoT device that is the target of management. An example of a data configuration of the communication profile management database 310 is illustrated in FIG. 8, and an example of a data configuration an eSIM management database 320 is illustrated in FIG. 9. A communication interface 330 is an interface for an Internet connection. A database management unit 332 constructs and updates management databases 310 and 320 so that the communication profiles that can be assigned to the IoT device are shared (100) with the subscription management apparatus 13. A determination unit 334 for determining whether an update is necessary determines whether it is necessary to update a communication profile within an eSIM that the IoT device has based on the PLMN-ID and eUICC-ID that the wireless IoT device 11 notified and the management databases 310 and 320. The details of the operation of the determination unit 334 are described later with reference to FIG. 7.

FIG. 4 is a view for describing an operation for updating a communication profile by the wireless communication system (FIG. 1) according to a first embodiment. In FIG. 4, a control procedure for, in the wireless network 420, automatically updating the communication profile within the wireless IoT device 11 to something suitable in accordance with the location at which the device is operating is illustrated schematically.

In FIG. 4, the wireless IoT devices 11 and the IoT device management system 12 that manages the wireless IoT device 11 via the wireless network are as described in FIG. 1. Also, in FIG. 4, a subscription management apparatus 410 for the communication operator 1 and a subscription management apparatus 411 for the communication operator N that manage the communication profiles within the eSIM that the wireless IoT devices 11 have are illustrated. Also, FIG. 4 illustrates a state in which a notification signal from a base station 421 that the communication operator 1 manages and a base station 422 that the communication operator N manages is received by the wireless IoT device 11, upon movement of the wireless IoT device 11.

Figure 6:
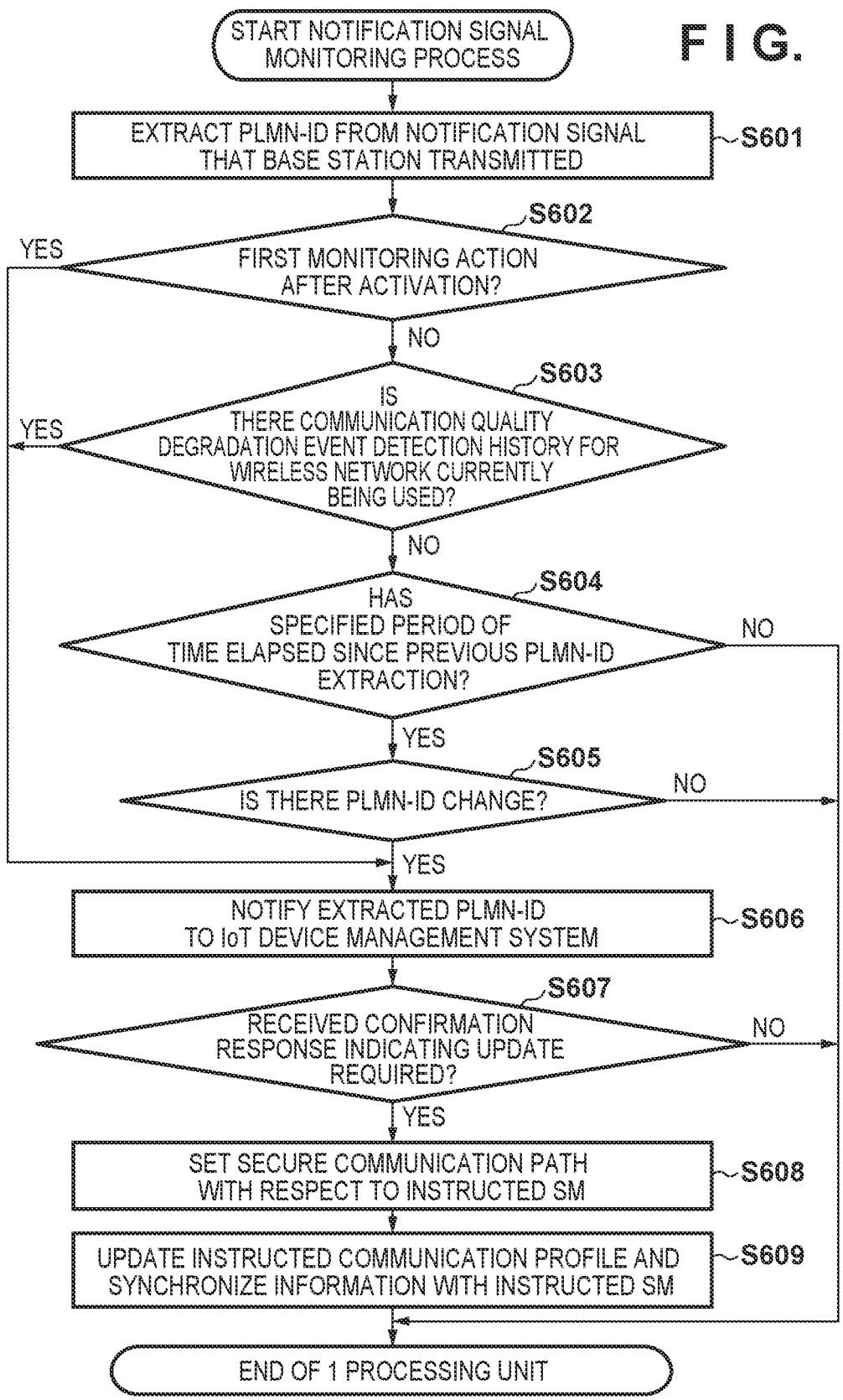
FIG. 6 is a flowchart for describing processing of the wireless communication apparatus according to a first embodiment.

Examples of message sequences between the respective apparatuses when communication profile update is performed are illustrated in FIG. 5A, FIG. 5B, and FIG. 5C. Also, FIG. 6 is a flowchart for illustrating processing that the wireless IoT device 11 performs additionally at a timing of monitoring notification signal information from the base station. FIG. 7 is a flowchart illustrating processing that is performed in a case where the IoT device management system 12 received a request for confirmation of whether or not a communication profile update is necessary from the wireless IoT device 11. Hereinafter, with reference to FIG. 4 to FIG. 7, an example of corresponding control of the wireless IoT device 11 of the first embodiment when a wireless cell switch occurs during standby to start a communication service (a power saving state in which only stand by for incoming calls is performed) will be described.

The wireless IoT device 11, when activation or reactivation is performed, and hardware and software activation completes, monitors for notification signals that the base station configuring the communication area that it is within transmits. In the example of FIG. 4 and FIG. 5A, only a notification signal 501 from the base station 421 is received by the wireless IoT device 11 prior to the movement of the wireless IoT device 11. Then, upon movement of the wireless IoT device 11, it changes such that the notification signal 501 of the base station 421 and a notification signal 502 from the base station 422 are received by the wireless IoT device 11. The wireless IoT device 11 extracts a PLMN-ID of the transmission origin base station from the notification signal 501 and the notification signal 502, and stores the extracted information in the wireless network identifier storage unit 214 (step S41 of FIG. 4 and step S601 of FIG. 6). Note, in the present example, the case where notification signals from two base stations according to two communication providers is received is described, but if there are three or more base stations according to three or more communication providers, notification signals from three or more base stations will be received.

Next, the wireless IoT device 11 determines the need for performing confirmation as to whether a communication profile update is necessary (step S51 and steps S602 to S605). In the present embodiment, in a case where any one of the following conditions (1) to (3) is satisfied when the wireless IoT device 11 receives the notification signal, confirmation of whether a communication profile update is necessary is determined to be necessary. Note, in the case where confirmation of whether a communication profile update is necessary is determined not to be needed, the present processing is ended.

(1) the case where after activation or after reactivation of the wireless IoT device 11, a first notification signal is detected (YES in step S602).

(2) the case where there is a history of a communication quality (wireless line quality) degradation occurring in the wireless network that is currently used (YES in step S603). In other words, this a case where there is history of detecting that a wireless line quality measurement result in the wireless network that is currently used fell below a specified value. Note that the wireless line quality measurement may include, for example, a measurement of a communication throughput, and/or a measurement of a communication frame error rate.

(3) the case (YES in step S604 and step S605) where the current PLMN-ID (combination) changed from a previous PLMN-ID (combination) after a specified period of time (predetermined amount of time) has elapsed from the previous confirmation (the previous PLMN-ID extraction).

In a case where the confirmation as to the necessity of the communication profile update determined it to be necessary, the wireless IoT device 11 sets the communication session with the IoT device management system 12 and notifies the PLMN-ID being received (including the PLMN-ID currently being used) (step S606). More specifically, the wireless IoT device 11 uses the communication profile for the communication operator 1 currently being used, to perform an RRC connection 503 and a communication bearer setting 504. The RRC connection 503 is a connection setting for a path for wireless communication path with the base station 421 of a communication operator that is being used. The communication bearer setting 504 is a setting of a data communication path via a data gateway of a communication operator that is being used. After the communication bearer setting 504, the wireless IoT device 11, in relation to the IoT device management system 12, sets a data communication session, and transmits (step S42 and step S52) a message of the request 101 to confirm whether the communication profile update is necessary. The message for confirmation 101 includes a PLMN-ID (a PLMN-ID being received) that is stored in the wireless network identifier storage unit 214 and an eUICC-ID which is eSIM device identification information. Note that in a case where it is determined that it is necessary to confirm whether the update is necessary by the above condition (1), the PLMN-ID of the communication profile that is set to be used by default in the wireless IoT device 11 among the extracted PLMN-IDs is used as the current PLMN-ID.

The IoT device management system 12 (the determination unit 334), after receiving the request 101 to confirm whether the communication profile update is necessary, starts the processing illustrated in FIG. 7. First, the IoT device management system 12 references the management databases 310 and 320 (FIG. 8 and FIG. 9) within the IoT device management system 12 with the PLMN-ID and eUICC-ID information notified in the request 101 to confirm whether the communication profile update is necessary as an indicator. The IoT device management system 12, based on the wireless network identifier, confirms whether or not there is present a communication operator, among the communication operators other than the communication operator of the wireless network currently being used, that is currently usable and that satisfies a predetermined condition. A communication operator that satisfies the predetermined condition is a communication profile that is determined to be more suitable than the currently used communication profile and that can be distributed. The IoT device management system 12 uses presence or absence of such a communication profile as the condition for confirming whether or not a communication profile update is necessary (step S701). In other words, the determination unit 334 of the IoT device management system 12 determines that the communication profile update is necessary in a case where there is, among the notified PLMN-IDs, a communication profile (a communication profile that satisfies a predetermined condition) that is more suitable than the currently used communication profile and can be distributed.

As described above, in the determination as to whether the communication profile update is necessary, the wireless IoT device 11 that is the transmission source of the request 101 for confirming whether the communication profile update is necessary determines whether there is a communication operator more suitable than the communication operator that is currently in the enabled state based on the notified PLMN-ID. In the present example, an example is described in which a necessity determination as to whether a communication profile update is necessary is performed using: a priority of a provision communication speed indicator for each communication operator for the necessity determination due to the communication quality degradation; and a priority of a communication usage charge indicator for each communication operator for the necessity determination due to something other than communication quality. In FIG. 8 and FIG. 9, these priorities are described as suitability determination priorities.

In a case where there is no more suitable communication operator than the currently used communication operator, the communication profile update is determined to be unnecessary in step S701 (NO in step S702). In such a case, the IoT device management system 12 sets a status instructing that the currently used communication profile continue to be used, and returns the response 102 confirming whether or not the communication profile update is necessary (step S708 and step S43). Meanwhile, in a case where a more suitable communication operator than the communication operator that is currently being used exists, it is determined (YES in step S702 and step S53) that a communication profile update is necessary in the determination (step S701) as to whether or not the update is necessary. In such a case, the IoT device management system 12 first confirms (step S703) that the communication profile of the more suitable communication operator is already stored in the eSIM within the wireless IoT device 11 which is the transmission source of the confirmation request 101.

In a case where it is determined to be already stored (YES in step S703), the IoT device management system 12 sets a status that instructs the update to the already stored communication profile (changes the communication profile that is the enable target) and returns the confirmation response 102 (step S707 and step S43). Meanwhile, in the case where it is determined to be not already stored (NO in step S703), a message 505 for requesting a line contract for newly issuing the communication profile is transmitted to the subscription management apparatus of the communication operator determined to be more suitable (step S704). In the present example, the message 505 is transmitted to the subscription management apparatus 411 of the communication operator N.

The subscription management apparatus 411 that received the message 505 requesting the line contract transmits a message 506 for updating the route for accessing the subscription management apparatus to the subscription management apparatus 410 for the communication operator 1 that is the update origin. The IoT device management system 12 determines that the new communication profile issuance reception is completed when a message 507 indicating the new communication profile issuance reception confirmation is received (YES in step S705). The IoT device management system 12, when it is determined that the new communication profile issuance reception completed, transmits to the wireless IoT device 11 the confirmation response 102 including the instruction to update to the new communication profile (step S706, step S43, and step S54). In this confirmation response 102, for example, a status instructing the update to the communication profile newly issued and a code for activating a new communication profile are set. Based on the return of the confirmation response 102 confirming whether the communication profile update is necessary, the IoT device management system 12 ends the processing of one communication session unit.

The wireless IoT device 11, after receiving the confirmation response 102 confirming whether the communication profile update is necessary, refers (step S607) to the instruction status notified by the confirmation response 102 after the release of the data communication session with the IoT device management system 12. In a case where the status to the effect that an update is unnecessary is received (NO in step S607), the present processing (additional processing when a notification signal is received) is ended. Meanwhile, in the case where a status to the effect that the update is necessary is received (YES in step S607), it is recognized that updating of the communication profile to be used is necessary (the need for an update) (step S55) and the wireless IoT device 11 activates the communication profile updating processing (step S56).

After activation of the communication profile update processing, the wireless IoT device 11 first issues a route query 508 to the subscription management apparatus 410 for the communication operator 1 that is currently being used. The route query 508 is a query for information on a route for accessing the subscription management apparatus 411 (for example, an IP address, a domain name, or the like of the subscription management apparatus 411) for the communication operator N that is the update destination. The subscription management apparatus 410 returns a route response 509 in accordance with the content of the message 506 for updating the route for accessing the subscription management apparatus that is issuance source of the communication profile. This route response 509 includes information on the route for accessing the subscription management apparatus 411 for the communication operator N which is the update destination.

The wireless IoT device 11, in accordance with the access route information acquired from the route response 509, issues (step S44) a secure communication path setting request, and performs (step S608) a connection 510 of a secure communication path for the communication profile download. The secure communication path is a communication path for, in relation to the subscription management apparatus 411 for the communication operator N, encrypting data of a data communication payload using an encryption key that is shared between apparatuses and communicating the encrypted data.

After completion of the connection 510 of the secure communication path, a communication profile update notification 511 from the subscription management apparatus 411 of the update destination communication operator N is transmitted to the wireless IoT device 11 (step S45). After that, the wireless IoT device 11 executes a release 512 of the secure communication path. Then, the wireless IoT device 11 performs a release 513 of the communication bearer using the communication profile for the communication operator 1 prior to the update and an RRC release 514. In the communication bearer release 513, a release of the data communication path via a data gateway 423 of a communication operator that is being used is performed. Also, in the RRC release 514, the release of the wireless communication path with respect to the base station 421 of the communication operator that is being used is performed. After that, the wireless IoT device 11 switches (step S57 and step S609) the communication profile to use (the communication profile that is the enable target in the eSIM) to the communication profile 110 of the communication operator N.

The wireless IoT device 11, after the communication profile switch (step S57), performs communication by the wireless network that the suitable communication operator provides (communication via the base station 422 and the data gateway 424). In other words, the wireless IoT device 11, using the communication profile for the communication operator N, performs an RRC connection 515 (setting for connecting the wireless communication path with the base station 422) and the communication bearer setting 516 (setting of the data communication path via the data gateway 424). After the communication bearer setting, the wireless IoT device 11 issues a route query 517, which is a query of the access route information, to the subscription management apparatus 411 for the communication operator N. The subscription management apparatus 411 returns the route response 518 which includes information on the route for accessing the self-apparatus.

The wireless IoT device 11, in accordance with the access route information acquired from the subscription management apparatus 411, performs a connection 519 of the secure communication path with the subscription management apparatus 411 of the communication operator which is the switch destination. After that, the wireless IoT device 11 returns to the subscription management apparatus 411 a communication profile update completed notification 520. By this, it is possible to synchronize the conditions for setting the communication profile that is to be enabled in the eSIM within the wireless IoT device 11 and the subscription management apparatus 411. After that, the wireless IoT device 11 performs a release 521 of secure communication path with the subscription management apparatus 411. The wireless IoT device 11 performs a communication bearer update 522 (an update to a data communication path via a data gateway of a used communication operator) corresponding to an updated communication profile characteristic (fee and speed conditions), while maintaining the wireless connection (RCC connection).

The above is control that is executed at a timing at which monitoring of notification signal information is performed in the first embodiment. Note that an example in which the communication speed and communication charges as exemplified in FIG. 8 and FIG. 9 are used in the present embodiment as the conditions for determining whether a communication profile update is necessary, but limitation is not made to this. For example, configuration may be taken so as use an amount of delay that occurs during data communication for the conditions for determining.

As described above, the wireless IoT device, which is the wireless communication apparatus of the first embodiment, periodically monitors for notification signals that are being transmitted from the base station. Then, the wireless IoT device 11 recognizes the PLMN-ID included in the notification signal, and based on the recognized PLMN-ID, confirms using the IoT device management system 12 whether or not there is a more suitable communication operator than the communication operator currently being used. When it is determined by this confirmation that there is a more suitable communication operator than the communication operator currently being used, the wireless IoT device 11 sets a secure wireless link, and thereby prepares for the communication operator update processing. Meanwhile, when it is determined that there is no more suitable communication operator, the wireless IoT device 11 does not set the secure wireless link. Note that the secure wireless link is a communication path for which the data of the data communication payload for communication profile update processing is encrypted using an encryption key shared between apparatuses, and communicated.

By the above, the wireless communication apparatus that incorporates the eSIM can automatically select, based on conditions, the most advantageous communication operator for the location at which the apparatus is operating, and can download a communication profile of the communication operator. As a result, the wireless communication apparatus can use a communication operator line for which conditions are more advantageous at the location at which it operates.

Second Embodiment

In the first embodiment, the wireless communication apparatus (the wireless IoT device 11) periodically monitors the notification signal, and uses the PLMN-ID extracted from the notification signal as the indicator to cause the IoT device management system 12 which is an external apparatus to determine whether or not there is a more suitable communication operator. In the second embodiment, the wireless IoT device itself determines whether or not there is a more suitable communication operator by, in the wireless IoT device which is a wireless communication apparatus, maintaining and using suitability information which is synchronized with communication operator information on the IoT device management system.

Figure 10:
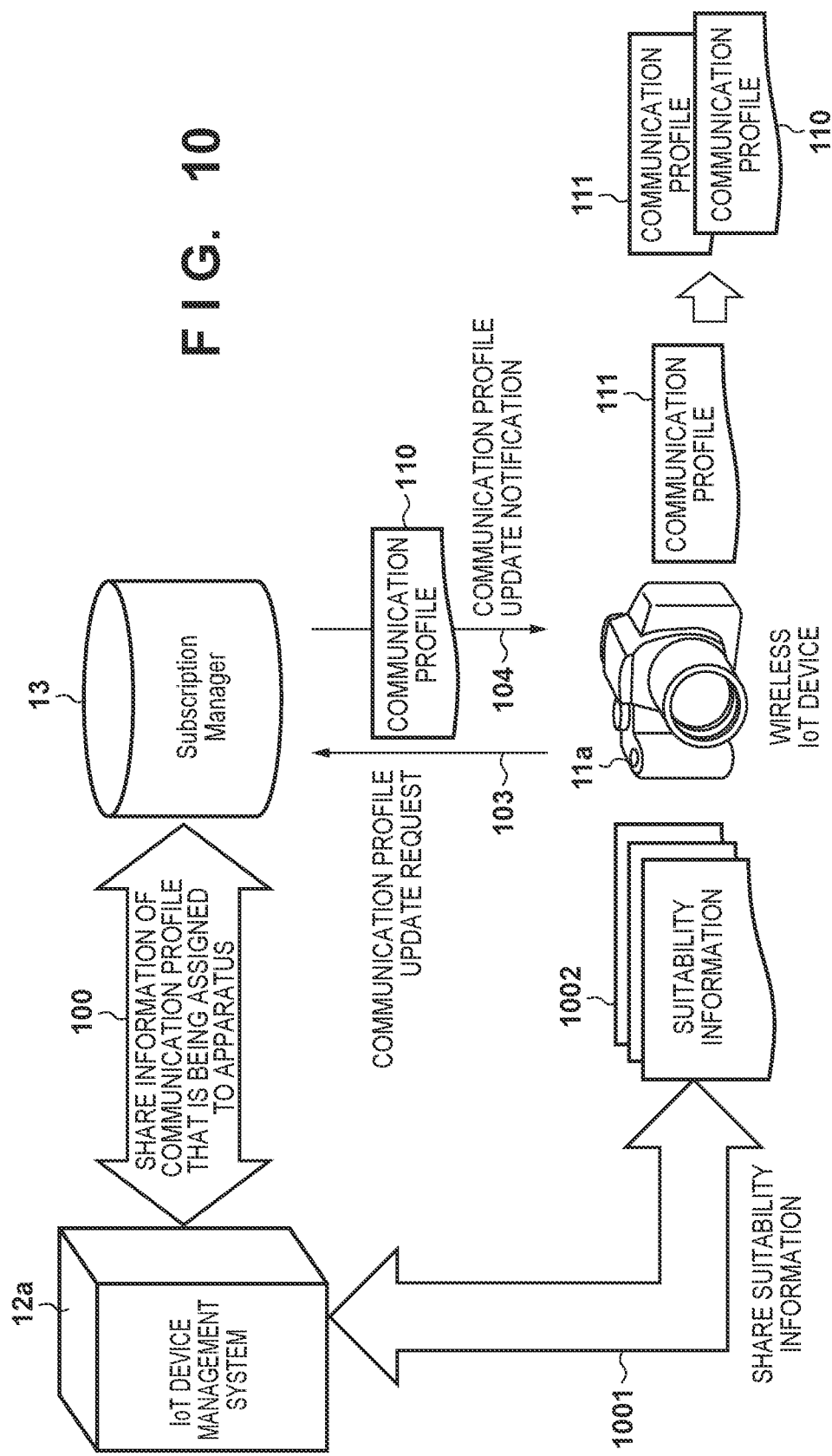
FIG. 10 is a view illustrating an example of a configuration of a wireless communication system according to a second embodiment.

FIG. 10 is a schematic diagram illustrating an example of a configuration according to the second embodiment of a wireless communication system for automatically updating a communication profile that the eSIM in the wireless IoT device uses. The wireless communication system comprises a wireless IoT device 11a, an IoT device management system 12a that manages the wireless IoT device 11a via a network, and the subscription management apparatus 13 that manages the communication profile in the eSIM of the wireless IoT device 11a. Similarly to in the first embodiment, information as to whether or not there is a communication profile that can be assigned to the wireless IoT device 11a between the IoT device management system 12a and the subscription management apparatus 13 is shared (100) using periodic message exchange or the like. Also, the wireless IoT device 11a of the second embodiment shares (1001), with the IoT device management system 12a for managing the self-apparatus, information for suitability determination (suitability information 1002) where PLMN-ID information is made to be an indicator. The wireless IoT device 11a performs sharing (1001) of the suitability information 1002 by inter-apparatus message communication (described later in FIG. 13A) which is performed steadily with the IoT device management system 12a.

The wireless IoT device 11a refers to the suitability information 1002 acquired by sharing of information for making a determination, and determines whether the communication profile update is necessary. When the wireless IoT device 11a recognizes the need for a communication profile update, it transmits the update request 103 of the communication profile to the subscription management apparatus 13, and then as a response to the update request 103, receives the communication profile update notification 104. The wireless IoT device 11a acquires the communication profile 110 to be updated from the update notification 104. When the communication profile 110 to be updated is acquired, the wireless IoT device 11a updates the communication profile to be used to the acquired communication profile 110 from the communication profile 111 that is being used. Note that the communication profile of the second embodiment is subscription information that a wireless communication operator provides, similarly to the first embodiment, and for example, a telephone number, an IMSI (refer to FIG. 17A), or the like is envisioned.

Figure 11:
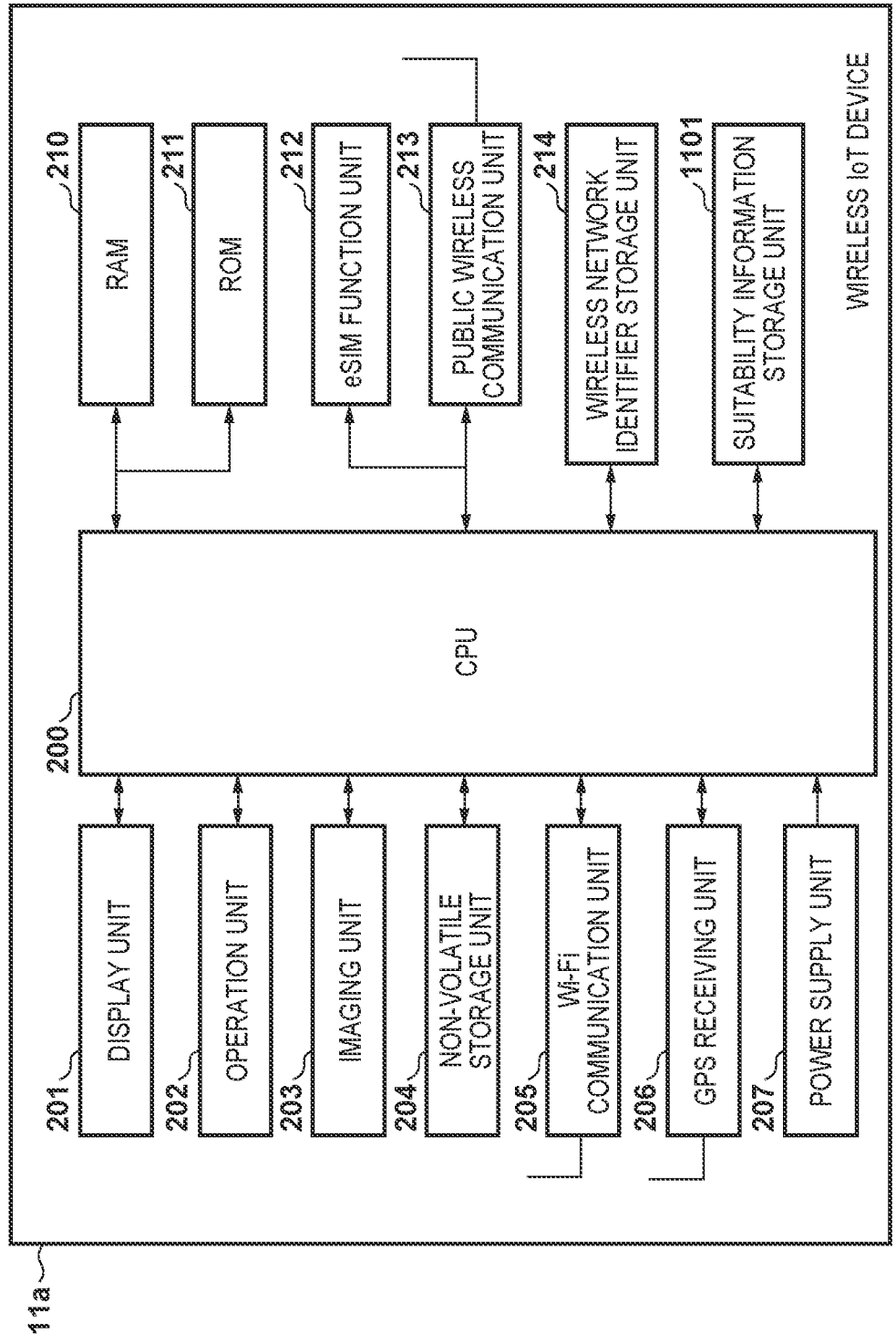
FIG. 11 is a block diagram illustrating an example of a functional configuration of a wireless communication apparatus according to a second embodiment.

FIG. 11 is a block diagram illustrating an example of a functional configuration of the wireless IoT device 11a according to a second embodiment. The same reference numeral is added to a functional block similarly to in the first embodiment (FIG. 2). The wireless IoT device 11a, in addition to the configuration of the wireless IoT device 11 of the first embodiment, comprises a suitability information storage unit 1101. The suitability information storage unit 1101 stores the above-described communication operator suitability information 1002. Note that the suitability information storage unit 1101 may be configured by the RAM 210 and the non-volatile storage unit 204. Note that an example of a functional configuration of the IoT device management system 12a is approximately similar to the first embodiment (FIG. 3). However, the IoT device management system 12a of the second embodiment, in place of the determination unit 334, comprises a unit for suitability information sharing which is for sharing suitability information with the wireless IoT device 11a.

Figure 12:
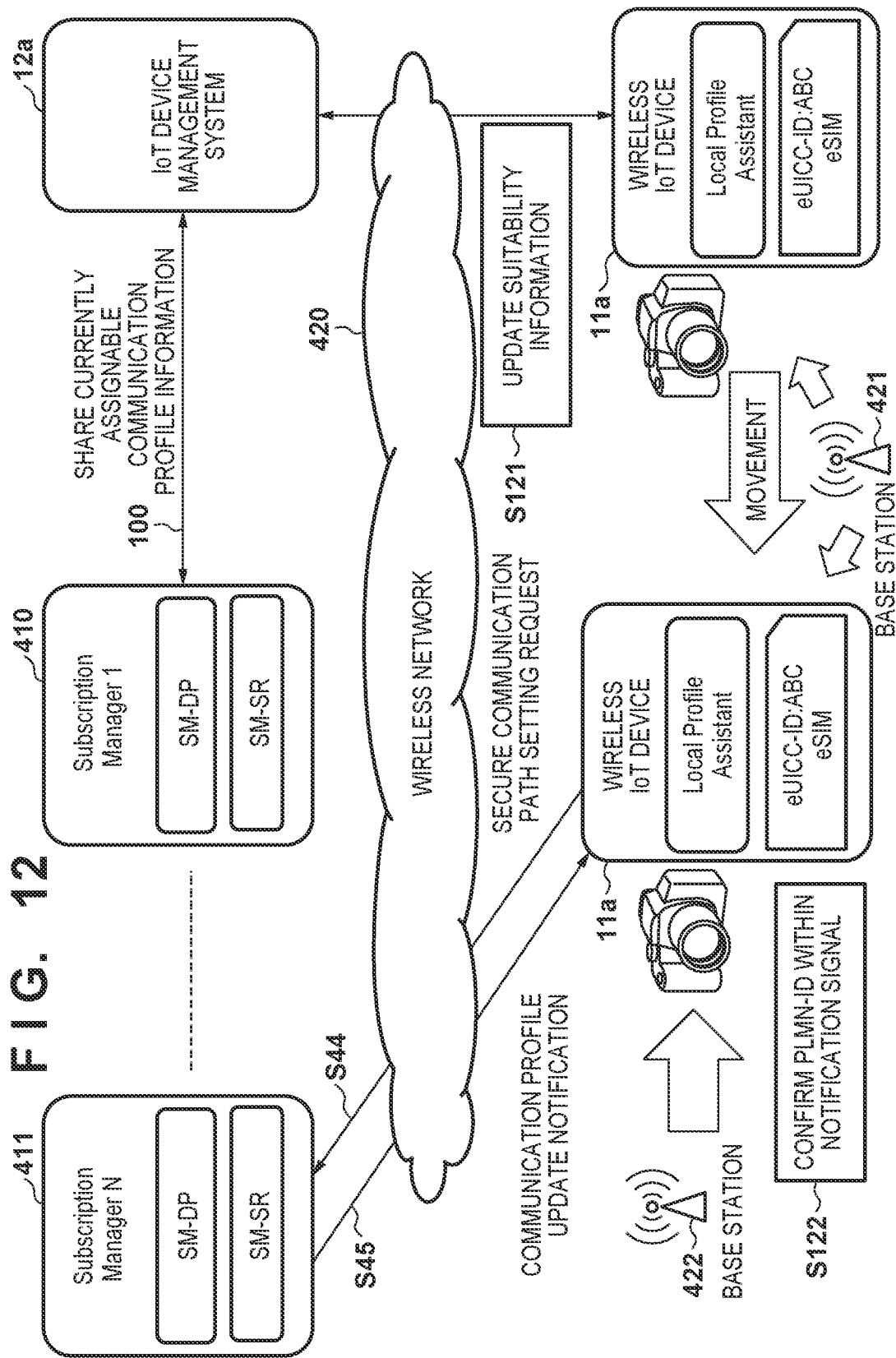
FIG. 12 is a schematic diagram illustrating processing for updating communication profile according to the second embodiment.
Figure 13A:
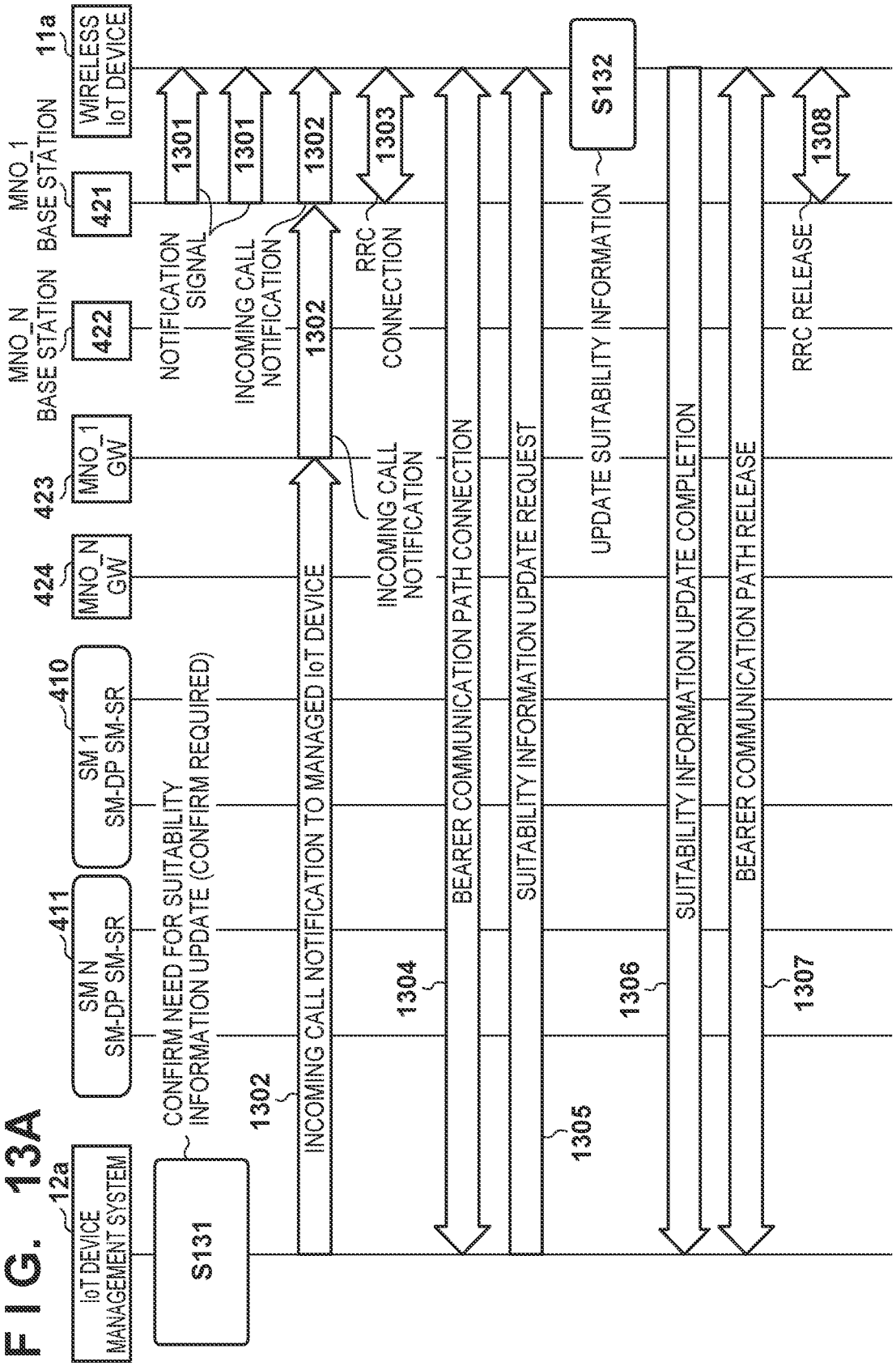
Figure 15:
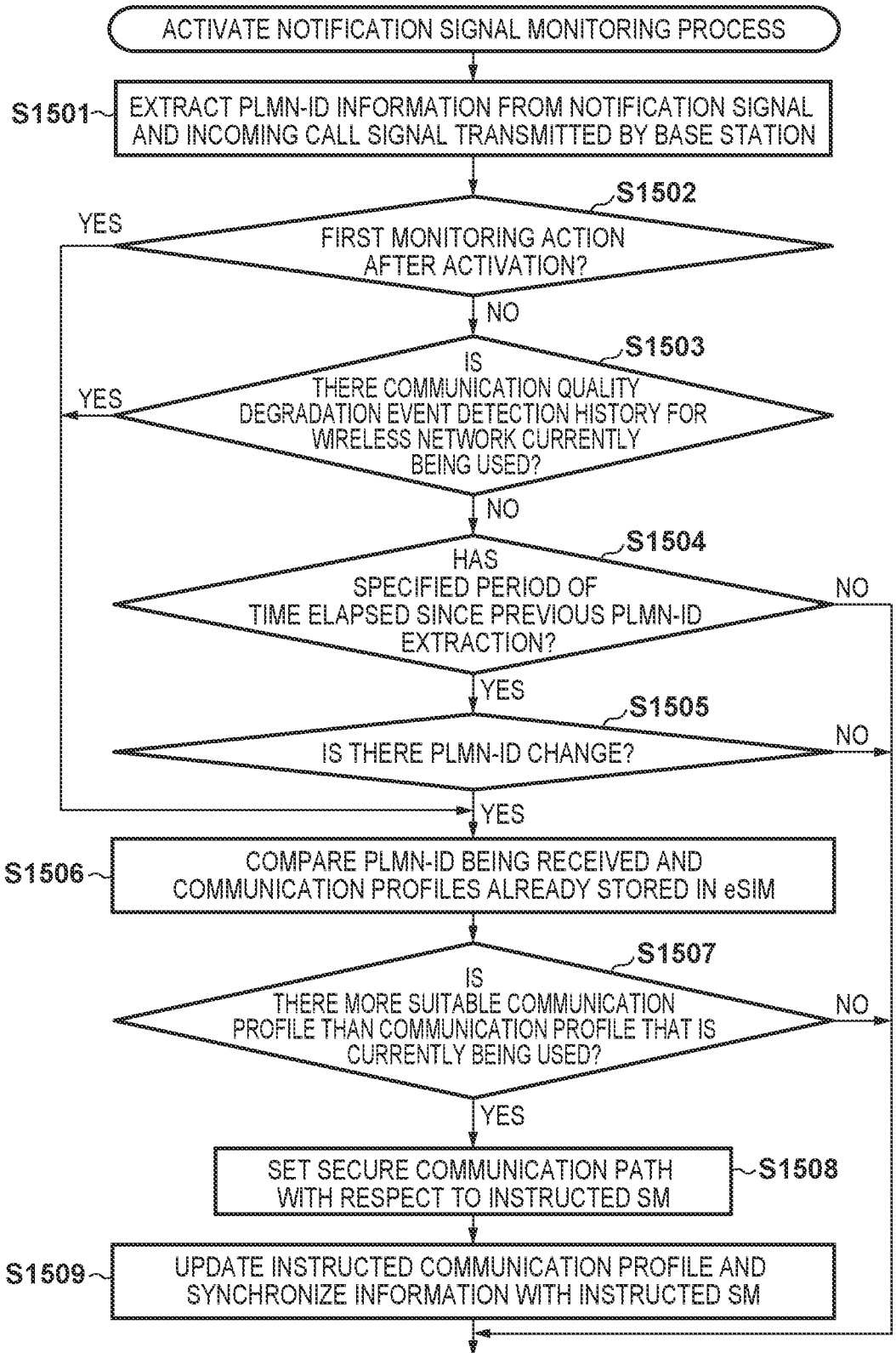
FIG. 15 is a flowchart for describing processing of a wireless communication apparatus according to a second embodiment.

FIG. 12 is a view for describing an operation of updating a communication profile that is executed by the wireless communication system (FIG. 10) according to a second embodiment. Below, examples of message sequences between the respective apparatuses when an operation illustrated in FIG. 12 is performed are illustrated in FIG. 13A, FIG. 13B, and FIG. 13C. Also, an example of a data configuration of an information table stored in the suitability information storage unit 1101 is illustrated in FIG. 14. Also, FIG. 15 is a flowchart that illustrates processing that the wireless IoT device 11a executes additionally at a timing at which the notification signal from the base station is monitored.

First, for control in which the IoT device management system 12a and the wireless IoT device 11a share the suitability information 1002 of the communication operator where PLMN-ID information is made to be an indicator is described with reference to FIG. 13A. FIG. 13A illustrates an example of a control procedure for updating the suitability information stored in the suitability information storage unit 1101 of the wireless IoT device 11a in synchronization with the update of the communication operator information on the IoT device management system 12a side. The wireless IoT device 11a monitors the notification signal 1301 that the base station 421 configuring the communication area that self-apparatus is in transmits, and extracts the PLMN-ID information of the transmission origin base station that is notified in a notification signal 1301, and stores that information in the wireless network identifier storage unit 214.

Meanwhile, the IoT device management system 12a, by reconsidering the communication cost and traffic and the like, performs an update of the suitability information of the communication operator as the system. When the suitability information update is performed, the IoT device management system 12a recognizes the need for updating the suitability information that the wireless IoT device 11a that the self-apparatus manages maintains (step S131). The IoT device management system 12a, after recognizing the need for an update, performs an incoming call notification 1302 with respect to the wireless IoT device 11a for which the stored information update is necessary. The wireless IoT device 11a, after receiving the incoming call notification 1302 from the IoT device management system 12a, uses a communication profile for the communication operator 1 that is currently being used, to perform the RRC connection 1303. Also, in the RRC connection 1303, a connection setting for the wireless communication path with respect to the base station 421 of the communication operator that is being used is performed. Then, the wireless IoT device 11a makes a bearer communication path connection 1304 with the IoT device management system 12a. In the bearer communication path connection 1304, a data communication path via the data gateway 423 of the communication operator that is being used is set and connected.

The IoT device management system 12a, after recognizing a connection 1304 of the bearer communication path, issues a suitability information update request 1305, and makes a notification to the wireless IoT device 11a that updating of the suitability information of the communication operator is necessary. The wireless IoT device 11a after receiving the update request 1305 updates the suitability information 1002 within the suitability information storage unit 1101 in accordance with the suitability information update content notified by the update request 1305 (step S121 and step S132). When the update of the suitability information 1002 completes, the wireless IoT device 11a notifies the IoT device management system 12a of the update completion 1306. After transmission of the update completion 1306, the wireless IoT device 11a performs a release 1307 of the bearer communication path which was set in response to the incoming call notification 1302, and an RRC release 1308. The above is processing for automatically updating to synchronize the suitability information 1002 by the wireless IoT device 11a of the second embodiment. As described above, the wireless IoT device 11a, triggered by an incoming call from the IoT device management system 12a which is an external apparatus, updates the suitability information 1002 via the communication path set between it and the IoT device management system 12a.

Next, an example of the corresponding control for when a wireless cell switch occurs when the wireless IoT device 11a of the second embodiment is on standby to wait for the start of a communication service (FIG. 13B and FIG. 13C) will be described. The wireless IoT device 11a monitors for a notification signal transmitted by the base station that configures the communication area that the self-apparatus is within, and extracts the PLMN-ID of the transmission origin base station notified in the notification signal, and stores it in the wireless network identifier storage unit 214 (step S1501). In the example of FIG. 12 and FIG. 13B, by the movement of the wireless IoT device 11a, the notification signal 1309 from the base station 421 and the notification signal 1310 from the base station 422 end up being received by the wireless IoT device 11a. Next, a confirmation as to the need for confirming whether or not an update to the communication profile according to predetermined conditions is necessary is performed (step S1502 to step S1505).

In the second embodiment, it is confirmed whether or not a update (change) to the communication profile to be used is necessary by referencing the suitability information (FIG. 14) stored in the suitability information storage unit 1101. At the time of notification signal reception processing by the wireless IoT device 11a, in the case where any of the following conditions is satisfied, it is determined that a confirmation of whether an update to the communication profile to be used is necessary (steps S1502 to S1505 and step S133).

(1) the case where, after the wireless IoT device 11a activates or reactivates, a first notification signal is detected (YES in step S1502).

(2) the case where there is a history of a communication quality (wireless line quality) degradation occurring in the wireless network that is currently used (YES in step S1503). In other words, a case where there is history of detecting that a wireless line quality measurement result in the wireless network that is currently used fell below a specified value. Note that the wireless line quality measurement may be, for example, a measurement of a communication throughput, and/or a measurement of a communication frame error rate.

(3) the case (YES in steps S1504 and S1505) where the current PLMN-ID (combination) changed from a previous PLMN-ID (combination) after a specified period of time (predetermined amount of time) has elapsed from the previous confirmation (the previous PLMN-ID extraction).

When the confirmation is determined to be necessary (step S133), the wireless IoT device 11a compares (step S1506) the suitability information 1002 (illustrated in FIG. 14) stored in the suitability information storage unit 1101 and the received PLMN-ID information. According to this comparison, the wireless IoT device 11a determines (step S1507) whether or not there is present a more suitable communication operator than the communication profile that is currently being used. Note that in the case where the confirmation as to whether an update is needed is determined to be necessary in accordance with the above condition (1), the PLMN-ID of the communication profile that is set to be used by default in the wireless IoT device 11 is used as the PLMN-ID that is currently being used. In the case where it is determined (NO in step S1507) that there is no more suitable communication operator than the communication operator that is currently being used, the wireless IoT device 11a ends that addition processing for when a notification signal is received.

Meanwhile, in a case where a more suitable communication operator than the communication operator that is currently being used exists, it is determined (YES in step S1507 and step S134) that an update to the communication profile to be used is necessary. Here, assume that it is determined that there is a communication operator N which is a more suitable communication operator. In such a case, the wireless IoT device 11a uses the communication profile for the communication operator 1 that is currently being used to execute the RRC connection 1311, and thereafter performs a communication bearer setting 1312. Also, in the RRC connection 1311, the connection setting of the wireless communication path with respect to the base station 421 of the communication operator that is being used is performed. In the communication bearer setting 1312, a setting of the data communication path via a data gateway 423 of a communication operator that is being used is performed.

After completion of the communication bearer setting 1312, the wireless IoT device 11a issues a route query 1313 for making a query to the subscription management apparatus 410 for the communication operator 1 for information on a route for accessing a subscription management apparatus 411 of the communication operator N. In the access route information, an IP address, a domain name, and the like are included. The subscription management apparatus 410, after receiving the route query 1313, returns a route response 1314 that includes the information (the IP address domain name, or the like) on the route for access the subscription management apparatus 411 of the communication operator N that is stored in the self-apparatus.

The wireless IoT device 11a, after receiving the route response 1314 including the access route information related to the subscription management apparatus 411 of the communication operator N of the update destination, makes a request to the subscription management apparatus 411 for a secure communication path setting. By this, the secure communication path connection 1315 is made (step S44 and step S1508). The secure communication path is a communication path for communicating data of a data communication payload for updating a communication profile after encrypting it using an encryption key that is shared between the apparatuses.

When a secure communication path connection with the subscription management apparatus 411 is completed, the wireless IoT device 11a, via the secure communication path, issues an assignment request 1316 for making a request to the subscription management apparatus 411 for assignment of a communication profile for updating. The subscription management apparatus 411 confirms parameter request information in the message of the assignment request 1316, and if there is no problem in making an assignment, a communication profile distribution 1317 for update is performed using the secure communication path. When the wireless IoT device 11a receives the communication profile distribution 1317 for the update, it executes the secure communication path release 1318. After that, the wireless IoT device 11a performs a release 1319 of the communication bearer for the communication operator 1 currently being used and the RRC release 1320.

The wireless IoT device 11a, when the release of the wireless communication path of the communication operator 1 completes, updates the communication profile to be enabled in the eSIM to the communication profile received by the distribution 1317 (step S135 and step S1509). After that, the wireless IoT device 11a, using the updated communication profile, performs the RRC connection 1321 and a communication bearer setting 1322. In the RRC connection 1321, a connection setting for the wireless communication path with the base station 422 of the communication operator after the update is performed. Also, in the communication bearer setting 1322, the data communication path setting is performed via the data gateway 424 of the communication operator after the update.

After completion of the communication bearer setting 1322, the wireless IoT device 11a makes a query 1323 for the access route information to the subscription management apparatus 411 for the communication operator N. The subscription management apparatus 411 returns a response 1324 including information on a route for accessing the self-apparatus in relation to this query 1323.

The wireless IoT device 11a, in accordance with access route information included in the response 1324, performs a secure communication path connection 1325 with the subscription management apparatus 411 of the switch destination communication operator. The secure communication path is a communication path for communicating data of a data communication payload after encrypting it using an encryption key that is shared between apparatuses. After a connection with a secure communication path, the wireless IoT device 11a returns the communication profile update completion notification 1326. By this, it is possible to synchronize (step S136) the setting status of a communication profile to be enabled in the eSIM in the wireless IoT device 11a with the subscription management apparatus 411.

After that, the wireless IoT device 11a performs a release 1327 of the secure communication path with the subscription management apparatus 411, and performs a communication bearer update 1328 while maintaining the RRC connection 1321. By this, an update is made to a communication bearer (the data communication path via the data gateway 424 of the communication operator that is being used) corresponding to characteristics (conditions of fees and speed) of the communication profile after the update. The above is control of the second embodiment that is performed at a timing after a wireless cell switch occurs.

As described above, the wireless IoT device 11a of the second embodiment automatically synchronizes the suitability information of the communication operator that is maintained in the self-apparatus with information of the communication operator that the IoT device management system 12a has. Also, the wireless IoT device 11a periodically monitors for the notification signal that is being transmitted from the base station, determines whether or not there is present a more suitable communication operator than the communication operator that is currently being used among the PLMN-IDs included in the notification signal, based on the suitability information in the self-apparatus. In the case where it is recognized by this determination that a more suitable communication operator than the communication operator that is currently being used, the wireless IoT device 11a sets a secure wireless link for communication profile update processing, and thereby prepares for the update processing. In the case where it is determined that there is no more suitable communication operator, the secure wireless link is not set.

By this, the wireless IoT device 11a incorporated in the eSIM can automatically select, based on conditions, the most advantageous communication operator for the location at which the apparatus is operating, and can download a communication profile of the communication operator. As a result, the wireless IoT device 11a can use a line of a communication operator whose conditions are more advantageous at the location at which the wireless IoT device 11a operates.

As explained above, according to the above-described first and second embodiments, the wireless communication apparatus in which the eSIM is provided can automatically update the communication profile by automatically selecting a more suitable communication operator from among the communication operators to which a wireless connection can be made at the location at which the wireless communication apparatus is operating.

In other words, by virtue of the above-described embodiments, a communication profile that the wireless communication apparatus uses can be updated to a more suitable communication profile for a location at which the wireless communication apparatus operates.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-005409, filed Jan. 16, 2020, which is hereby incorporated by reference herein in its entirety.

What is claimed is:

1. A communication apparatus, comprising:
at least one memory that stores a set of instructions; and
at least one processor that executes the instructions, the instructions, when executed, causing the communication apparatus to perform operations comprising:
  extracting a wireless network identifier from a received notification signal;
  confirming, based on the wireless network identifier, whether or not there is present a second communication operator, among communication operators other than a first communication operator of a wireless network currently being used, that is currently usable and satisfies a predetermined condition;
  transmitting, in a case where it is confirmed that the second communication operator is present, a request for a communication profile for the second communication operator to a subscription management apparatus of the second communication operator; and
  updating a communication profile to be used to a communication profile acquired from the subscription management apparatus of the second communication operator by the request,
wherein in a case where a predetermined time has elapsed since a previous confirmation is performed and where the wireless network identifier extracted as a result of the extracting are changed, the confirmation is executed in accordance with the received notification signal.

2. The communication apparatus according to claim 1, wherein the operations further comprise:
making a notification, of the extracted wireless network identifier, to an external apparatus that is managing a condition for an assignment of a communication profile to the communication apparatus, wherein the notification causes the external apparatus to confirm whether or not the second communication operator is present.

3. The communication apparatus according to claim 1, wherein the operations further comprise acquiring, from an external apparatus that is managing a condition for an assignment of the communication profile to the communication apparatus, a communication profile that the communication apparatus can use and an attribute of the communication profile, wherein
in the confirming whether or not the second communication operator is present is confirmed based on the acquired communication profile and the acquired attribute of the acquired communication profile.

4. The communication apparatus according to claim 3, wherein the operations further comprise:
storing, in a storage of the communication apparatus, the acquired communication profile and the acquired attribute of the communication profile,
wherein in the updating, the communication profile used to the communication is updated by using at least a newly stored communication profile in the storage.

5. The communication apparatus according to claim 3, wherein in the acquiring, the communication profile and the attribute of the communication profile are acquired through a communication path that is set in relation to the external apparatus in accordance with an incoming call from the external apparatus.

6. The communication apparatus according to claim 1, wherein the predetermined condition is a condition related to a communication charge.

7. The communication apparatus according to claim 1, wherein the predetermined condition is a condition related to a communication speed.

8. The communication apparatus according to claim 1, wherein after an activation or reactivation of the communication apparatus completes, the confirming is further executed in accordance with a first reception of the received notification signal.

9. The communication apparatus according to claim 1, wherein in a case where there is a history of having detected that a wireless line quality measurement result fell below a predetermined value, the confirmation is further executed in accordance with the received notification signal.

10. The communication apparatus according to claim 9, wherein the wireless line quality measurement includes a measurement of a communication throughput and/or a measurement of a communication frame error rate.

11. The communication apparatus according to claim 1, wherein the wireless network identifier is a PLMN-ID (Public Land Mobile Network-IDentifier).

12. A control method, comprising:
extracting a wireless network identifier from a received notification signal;

based on the wireless network identifier, confirming whether or not there is present a second communication operator, among communication operators other than a first communication operator of a wireless network currently being used, that is currently usable and satisfies a predetermined condition;

in a case where it is confirmed that the second communication operator is present, transmitting a request for a communication profile for the second communication operator to a subscription management apparatus of the second communication operator; and updating a communication profile to be used to a communication profile acquired from the subscription management apparatus of the second communication operator by the request, wherein in a case where a predetermined time has elapsed since a previous confirmation is performed and where the wireless network identifier extracted as a result of the extracting are changed, the confirmation is executed in accordance with the received notification signal.

13. A non-transitory computer readable storage medium in which a program for causing a computer to execute a control method is stored, the control method comprising:

extracting a wireless network identifier from a received notification signal;

based on the wireless network identifier, confirming whether or not there is present a second communication operator, among communication operators other than a first communication operator of the wireless network currently being used, that is currently usable and satisfies a predetermined condition;

in a case where it is confirmed that the second communication operator is present, transmitting a request for a communication profile for the second communication operator to a subscription management apparatus of the second communication operator; and updating a communication profile to be used to the communication profile acquired from the subscription management apparatus of the second communication operator by the request, wherein in a case where a predetermined time has elapsed since a previous confirmation is performed and where the wireless network identifier extracted as a result of the extracting are changed, the confirmation is executed in accordance with the received notification signal.

* * * * *